United States Patent
Hagen et al.

(10) Patent No.: US 12,136,322 B2
(45) Date of Patent: *Nov. 5, 2024

(54) VERIFICATION OF ITEMS BY AUTOMATED CHECKOUT SYSTEM

(71) Applicant: Target Brands, Inc., Minneapolis, MN (US)

(72) Inventors: Todd A. Hagen, Minneapolis, MN (US); Andrew Wipf, Minneapolis, MN (US); Donnie Tolbert, Minneapolis, MN (US); Arne Wilkin, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,176

(22) Filed: Feb. 12, 2024

(65) Prior Publication Data

US 2024/0185690 A1    Jun. 6, 2024

Related U.S. Application Data

(63) Continuation of application No. 17/964,595, filed on Oct. 12, 2022, now Pat. No. 11,935,374.

(Continued)

(51) Int. Cl.
  *G07G 1/00*      (2006.01)
  *G06Q 20/20*    (2012.01)
  *G06Q 20/32*    (2012.01)

(52) U.S. Cl.
  CPC .......... *G07G 1/009* (2013.01); *G06Q 20/202* (2013.01); *G06Q 20/208* (2013.01);
  (Continued)

(58) Field of Classification Search
  CPC .... G07G 1/009; G07G 1/0072; G06Q 20/202; G06Q 20/208; G06Q 20/3255
  See application file for complete search history.

(56) References Cited

U.S. PATENT DOCUMENTS

10,552,814 B2    2/2020   Volta et al.
11,935,374 B2 *  3/2024   Hagen ................... G07G 1/009
(Continued)

FOREIGN PATENT DOCUMENTS

WO     WO2020079651     4/2020

OTHER PUBLICATIONS

"Busu et al., ""Auto-Checkout System for Retails usingRadio Frequency Identification (RFID) Technology,"" 2011 IEEE Control and System Graduate Research Colloquium, Jun. 2011, 193-196".

(Continued)

*Primary Examiner* — Matthew Mikels
(74) *Attorney, Agent, or Firm* — Barnes & Thornburg LLP

(57) ABSTRACT

In some implementations, a system for verifying items in a retail environment includes a physical shopping cart including a first set of sensors, and an automated checkout station including a second, different set of sensors. The physical shopping cart receives item verification data for verifying an item, detects the item as it enters the physical shopping cart, and performs a primary verification of the item. The automated checkout station obtains a virtual shopping cart that corresponds to the physical shopping cart. The virtual shopping cart includes a list of items that have been placed in the physical shopping cart, and a verification status of each item. The second, different set of sensors generate station sensor data that represents the physical shopping cart and the items in the physical shopping cart. A secondary verification of the physical shopping cart and its contents is performed by the automated checkout station.

20 Claims, 18 Drawing Sheets

Related U.S. Application Data

(60) Provisional application No. 63/340,778, filed on May 11, 2022, provisional application No. 63/276,471, filed on Nov. 5, 2021.

(52) U.S. Cl.
CPC ....... *G06Q 20/3255* (2013.01); *G07G 1/0072* (2013.01); *G07G 1/0081* (2013.01)

(56) References Cited

U.S. PATENT DOCUMENTS

| | | |
|---|---|---|
| 2008/0243626 A1 | 10/2008 | Stawar et al. |
| 2018/0232796 A1 | 8/2018 | Glaser et al. |
| 2019/0279185 A1 | 9/2019 | Cheng |
| 2020/0082373 A1 | 3/2020 | Kozak |
| 2020/0275059 A1 | 8/2020 | De Bonet et al. |

OTHER PUBLICATIONS nordicid.com [online], "Is Deploying an RFID Self-Checkout System Affordable and Easy ☐?," Sep. 2011, retrieved on Oct. 12, 2022, retrieved from URL<https://www.nordicid.com/resources/blog/is-deploying-an-rfid-self-checkout-system-affordable-and-easy/>, 5 pages.

Satheesan et al., "Enhancement of Supermarket Using Smart Trolley," International Journal of Computer Applications, 0975-8887, 6 pages, Year: 2021.

"Shahroz et al., ""IoT-Based Smart Shopping Cart Using RadioFrequency Identification,"" IEEE Access, Apr. 2020, 8:68426-68438".

\* cited by examiner

Virtual Shopping Cart

| | | |
|---|---|---|
| Cereal | 10 oz. | $3.00 |
| Milk | 2 qt. | $3.50 |
| Bread | 1 loaf | $2.50 |
| *Ice Cream* | *1 pt.* | *$4.25\*\** |
| *Shirt* | *1* | *$20.00\*\** |
| TOTAL | | $33.25 |

\*\*\*Unverified Items

Please proceed to Manual Checkout Station when finished.

FIG. 7A

Virtual Shopping Cart

| | | |
|---|---|---|
| Cereal | 10 oz. | $3.00 |
| Milk | 2 qt. | $3.50 |
| Bread | 1 loaf | $2.50 |
| Ice Cream | 1 pt. | $4.25 |
| Shirt | 1 | $20.00\*\*\* |
| TOTAL | | $33.25 |

\*\*\*Unverified Items

OK to proceed to Automated Checkout Station when finished!

FIG. 7B

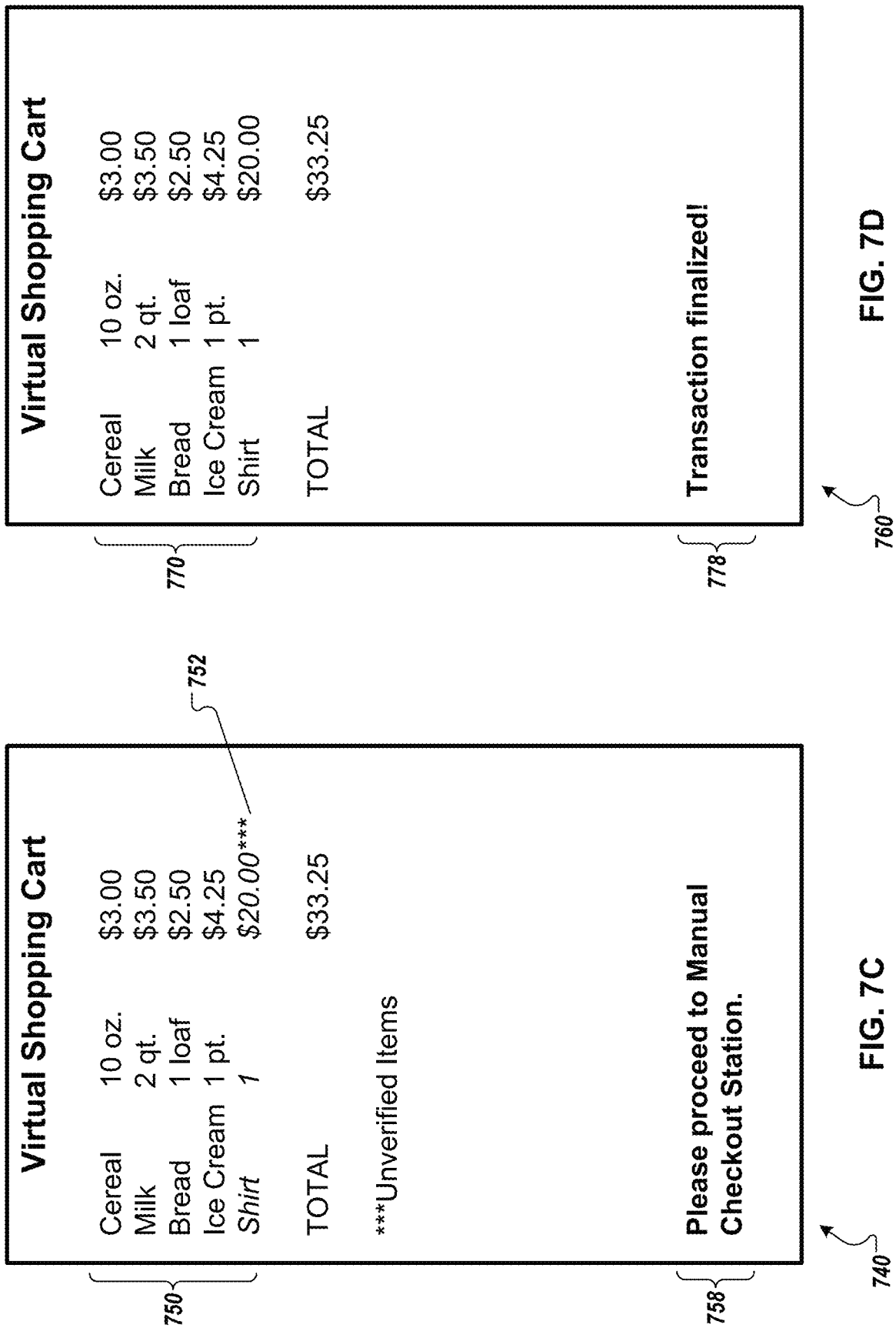

| Trust Level | Name | Population | Penalty | Benefit |
|---|---|---|---|---|
| 80-100% | Full Trust | High-trust shoppers and customers | 1% random chance of exit intervention | 99% chance of uninterrupted walk-out |
| 40-80% | Building Trust | New shoppers with limited reputation | 40% random chance of exit intervention | 60% chance of uninterrupted walk-out |
| 20-40% | Lost Trust | Occasional offenders | 90% random chance of exit intervention | 10% chance of uninterrupted walk-out |
| 0-20% | No Trust | Consistent repeat offenders | Automated checkout not offered until reputation is built in other ways | N/A |

VERIFICATION OF ITEMS BY AUTOMATED CHECKOUT SYSTEM

CROSS-REFERENCE TO RELATED APPLICATIONS

This application is a continuation of U.S. patent application Ser. No. 17/964,595, filed Oct. 12, 2022, which claims priority to U.S. Provisional Application Ser. No. 63/340,778, filed on May 11, 2022 and U.S. Provisional Application Ser. No. 63/276,471, filed on Nov. 5, 2021. The disclosures of all of the afore-mentioned applications are incorporated by reference herein in their entirety.

TECHNICAL FIELD

This specification generally relates to physical shopping carts that are used in physical retail stores and other shopping establishments, and to the verification of items placed in such physical shopping carts, by an automated checkout system.

BACKGROUND

Physical shopping charts have been used in retail stores and a variety of other shopping establishments (e.g., grocery stores, home improvement stores) to provide customers with a way to collect and transport items to a check-out area (e.g., point of sale terminal, cashier). Although physical shopping carts have a variety of different form factors and configurations, physical shopping carts generally include a frame, an area for the placement of items (e.g., basket, bin, platform), and a handle or other mechanism for customers to move the cart around. Physical shopping carts can include wheels on which the frame is mounted to permit the cart to be pushed around a store. Alternatively, physical shopping carts can include a handle or other mechanism permitting users to carry carts around a store. Some physical shopping carts (e.g., smart carts) can be equipped with a display device (e.g., a touchscreen) that can present a customer's shopping list, various promotional offers, and way-finding capabilities. Some physical shopping carts can be equipped with scanners/sensors that can be used to identify items in the store.

Some retail environments have permitted customers to use scan and go technology on their mobile devices (e.g., smartphones) to complete retail checkout in the retail environment instead of at a checkout lane or self-checkout lane. Scan and go technology can move the product scanning process further away from review of retail employee(s). Some scan and go systems have used employees to manually check and verify that the customer is leaving the store with only those items scanned and purchased on their mobile device before exiting the retail environment.

SUMMARY

This document generally describes computer systems, processes, program products, and devices for verifying items that have been placed in physical shopping carts, by automated checkout systems. For example, physical shopping carts can be equipped with one or more product detection systems (e.g., including physical sensors) that can electronically detect products that are placed in physical shopping carts. Mobile computing devices can be associated with (and optionally mounted on) the physical shopping carts to provide a variety of enhanced shopping cart features not possible with conventional physical shopping carts, such as electronically tracking the contents of a shopping cart, checking-out from automated checkout stations (instead of at conventional checkout areas, such as point of sale terminals), and others. A shopping cart (e.g., a smart cart) can be paired with a customer's personal mobile computing device (e.g., a smartphone), for example, and the customer's mobile device can run a mobile application that can communicate with a store's server systems. While shopping, for example, customers can use their mobile devices to scan items that they intend to purchase, before placing the items in their shopping carts. In response to an item scan, for example, the mobile device can retrieve item verification data that is specifically for use in verifying a scanned item, based on one or more physical sensors (e.g., infrared (IR) sensors, sound sensors, weight sensors, cameras, etc.) that are on the customer's shopping cart. When the customer places the item in the shopping cart, for example, the cart's physical sensors can detect the item, and can provide the sensor data to a verification engine (e.g., executed by the mobile device or a cart computing system), for comparison against the item verification data. Notifications regarding whether items are verified can be provided to the customer through the customer's mobile device and/or the shopping cart, and items can be added to a virtual shopping cart (e.g., maintained by the mobile device and/or server system) for a current shopping trip. If a sufficient quantity of items in the user's virtual shopping cart have been verified, for example, the mobile application running on the customer's mobile device can notify the user that an automated checkout process may be available to the customer.

An automated checkout process can be performed by an automated checkout station that can include one or more physical sensors that can used to determine whether the items referenced by the customer's virtual shopping cart correspond to items being detected by the station. For example, the automated checkout station can include a scale that weighs the shopping cart and its contents. If the overall weight measured by the automated checkout station sufficiently matches an expected weight of the shopping cart and its contents, for example, the shopping cart can be verified, the customer's transaction can be finalized, and the customer can simply leave the store. If the measured overall weight does not sufficiently match the expected weight, for example, the customer can be directed to a manual checkout station. As another example, the automated checkout station can include one or more sensors that are different from the sensors included in the shopping cart. For example, the shopping cart can include infrared (IR) sensors, sound sensors, and/or weight sensors, whereas the automated checkout station can include a weight sensor for weighing the shopping cart and its contents, one or more radio-frequency identification (RFID) sensors, and one or more cameras for verifying items in the cart. In general, the different sensors of the automated checkout station can be used to confirm verifications that have been performed using the shopping cart sensors (e.g., by performing a second verification), and/or to verify items that were not verifiable by the shopping cart sensors. For example, some items (e.g., products such as clothing or other soft goods) may not have a consistent shape that can be detected by IR sensors, may not produce a significant noise that can be detected by sound sensors, and/or may not produce a significant weight bump that can be detected by weight sensors of the shopping cart. In the present example, RFID tags can be added to such items, and the tags can be detected by RFID sensors of the automated checkout station to verify the items. Once all of the items in a customer's shopping cart have been verified by the shopping cart, the automated checkout station, or both (or a threshold amount of items have been verified), for example, the customer's transaction can be finalized, and the customer may leave the store.

The disclosed technology can be used in combination with and to improve mobile device-based scanning of items and checkout processes, such as scan and go checkout systems. For example, existing scan and go technology presents a variety of problems, including customers potentially taking a different item than the item scanned and misidentifying the quantity of products scanned versus taken, both of which can result in shortages for the retailer. Additionally, manual checks to ward against shortages with scan and go checkouts can present a variety of drawbacks, such as slowing down the checkout/departure process (mitigating some of the benefits of using scan and go technology), increasing labor costs for dedicated manually checkers, and potentially failing to remedy these issues due to potential human error during the checking process. The disclosed technology can resolve these and/or other problems with scan and go type systems. For example, the disclosed technology can provide for more accurate, granular, and efficient validation of scanned items as shopping progresses—meaning verifying that the physical item added to a shopping cart is the item that was scanned (and in the same quantity as recorded as part of the scan). This can provide a variety of benefits, such as reducing shortages and other inconsistencies between the physical goods that a customer leaves with and those that the customer pays for during the checkout process. For example, a customer may only be presented with an option to checkout on their mobile device if each scanned item (or a sufficient number of scanned items) has been validated by the shopping cart, and may otherwise be directed to physical checkout lanes if there are inconstancies between the scanned items and the physical items in the cart. This can permit for customers with fully validated carts to more quickly and readily checkout, can reduce the manual effort to manage such checkout processes for retailers, and can provide for greater levels of trust between retailers and customers using scan and go type systems, which can increase the prevalence and availability of such systems for customers across retail environments.

In some implementations, a system for verifying items in a retail environment includes a physical shopping cart including a first set of one or more sensors, and an automated checkout station including a second, different set of one or more sensors. The physical shopping cart can be configured to perform operations including receiving, from a mobile computing device, item verification data for verifying an item; detecting the item as the item enters the physical shopping cart; and using the first set of one or more sensors to generate cart sensor data that represents the item. The cart sensor data and the item verification data can be used to perform a primary verification of the item. The automated checkout station can be configured to perform operations including obtaining a virtual shopping cart that corresponds to the physical shopping cart. The virtual shopping cart includes a list of items that have been placed in the physical shopping cart, and a verification status of each item. The second, different set of one or more sensors are used to generate station sensor data that represents the physical shopping cart and at least one of the items that have been placed in the physical shopping cart. A secondary verification of the physical shopping cart and its contents is performed, based on the station sensor data and the virtual shopping cart.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. The automated checkout station can be configured to perform operations including linking the automated checkout station with the physical shopping cart. The mobile computing device can be configured to present a notification to a device user that the device user is permitted to proceed to the automated checkout station, when the primary verification of the item is successful. The mobile computing device can be configured to present a notification to a device user that the device user is permitted to proceed to the automated checkout station, when the item is not verifiable using the first set of one or more sensors, and the item is verifiable using the second, different set of one or more sensors. The mobile computing device can be configured to present a notification to a device user that the device user is permitted to leave the retail environment, when the secondary verification is successful. The verification status of each item can include data that indicates whether the item is verifiable using the first set of one or more sensors. The first set of one or more sensors can include at least one of an infrared sensor, a sound sensor, or a weight bump sensor. The second, different set of one or more sensors can include one or more radio frequency identification sensors. Performing the second verification of the physical shopping cart and its contents can include (i) using the one or more radio frequency identification sensors to detect radio frequency tags on items in the physical shopping cart, (ii) determining a set of expected radio frequency tags, based on the virtual shopping cart, and (iii) successfully verifying the physical shopping cart and its contents when each of the detected radio frequency tags matches a corresponding radio frequency tag in the set of expected radio frequency tags. The second, different set of one or more sensors can include a camera. Performing the second verification of the physical shopping cart and its contents can include (i) using the camera to identify items in the physical shopping cart, (ii) determining a set of expected items, based on the virtual shopping cart, and (iii) successfully verifying the physical shopping cart and its contents when each of the identified items matches a corresponding item in the set of expected items. The second, different set of one or more sensors can include a scale. Performing the secondary verification of the physical shopping cart and its contents can include (i) receiving a sensed weight of the physical shopping cart and its contents, (ii) determining an expected weight of the physical shopping cart and its contents, based on a tally of items associated with the virtual shopping cart, and (iii) successfully verifying the physical shopping cart and its contents when the sensed weight matches the expected weight.

The systems, devices, program products, and processes described throughout this document can, in some instances, provide one or more of the following advantages. A mobile device can be leveraged to conduct long-ranged communications with a server that maintains item information, and the information can be provided as needed by the mobile device to a smart cart using short-ranged communication. Thus, the smart cart may not need to communicate with the server directly, or to store and update data for many items, thereby potentially conserving communication, storage, and/or computing resources of the smart cart. Also, the smart cart can potentially be equipped with fewer (and more robust) sensing devices and output devices, as the user's mobile device is used for performing an initial item scan and for providing output to the user. Thus, the smart cart does not need to be equipped with a display screen or a scanner. Sensors for performing item verification can include infrared (IR) devices, microphones, and/or scales, which tend to be more robust than cameras (thus saving wear and tear on the carts). Battery power consumed by sensing devices can be conserved, by activating the sensing devices in response to item scans. By activating sensing devices immediately prior to a time when they are likely to be used and by activating a limited sensor timer, collected data can be limited to a time period corresponding to a timer of the sensor. When shopping has been completed, an automated checkout system can perform a secondary verification of items, thereby verifying items that could not be verified by the smart cart, or that were verified with low confidence. An automated checkout station can include one or more sensors that are different from, and potentially less robust and/or more expensive than sensors of the smart cart. Thus, expensive/fragile sensors can be leveraged for item verification, while maintaining the sensors in relatively few locations, rather than across many smart carts.

Other features, aspects and potential advantages will be apparent from the accompanying description and figures.

DESCRIPTION OF DRAWINGS

FIGS. 7A-D depict example interfaces for notifying users of items in a virtual shopping cart and virtual shopping cart statuses.

FIG. 9B depicts example trust tiers of reputation scores.

Like reference symbols in the various drawings indicate like elements.

DETAILED DESCRIPTION

This document describes technology that can verify items placed in physical shopping carts. For example, a shopping cart (e.g., a smart cart) can be equipped with an item detection system that is configured to automatically detect items that are placed in (and optionally, removed from) the shopping cart, and can be paired with a customer's mobile device that is in communication with a store's server systems. While shopping, customers can use their mobile devices to scan items that they intend to purchase. In response to scanning an item, the mobile device can provide verification data for the item (e.g., from the store's server systems) to the shopping cart, such as physical dimensions of the item, weight of the item, a sound profile of the item, and so forth. The shopping cart can use its item detection system (e.g., including one or more physical sensors) to collect sensor data associated with the item being placed in the cart, and a verification process can be performed to verify whether the item being added to the cart is the same item that was scanned by the mobile device, based on the sensor data and the verification data. A notification can be provided by the mobile device indicating whether the item added to the shopping cart is the scanned item, along with possibly providing information indicative of the verification results on the cart itself (e.g., green light for success, red light for failure). The state of the cart and the verification of its content can be maintained by the mobile device, which can then use this information to notify the customer of an available checkout process (e.g., express, Point of Sale (POS) terminal), and/or to facilitate the checkout process. If an automated checkout process is available, the customer may proceed to an automated checkout station that includes one or more sensors that are different from sensors of the shopping cart. The automated checkout station's sensors can be used to perform a secondary verification of the cart and its contents, and/or to verify items that were not verifiable by the shopping cart/mobile device. Once the cart and its contents have been verified, the customer's transaction can be finalized, and the customer may leave the store.

Figure 1:
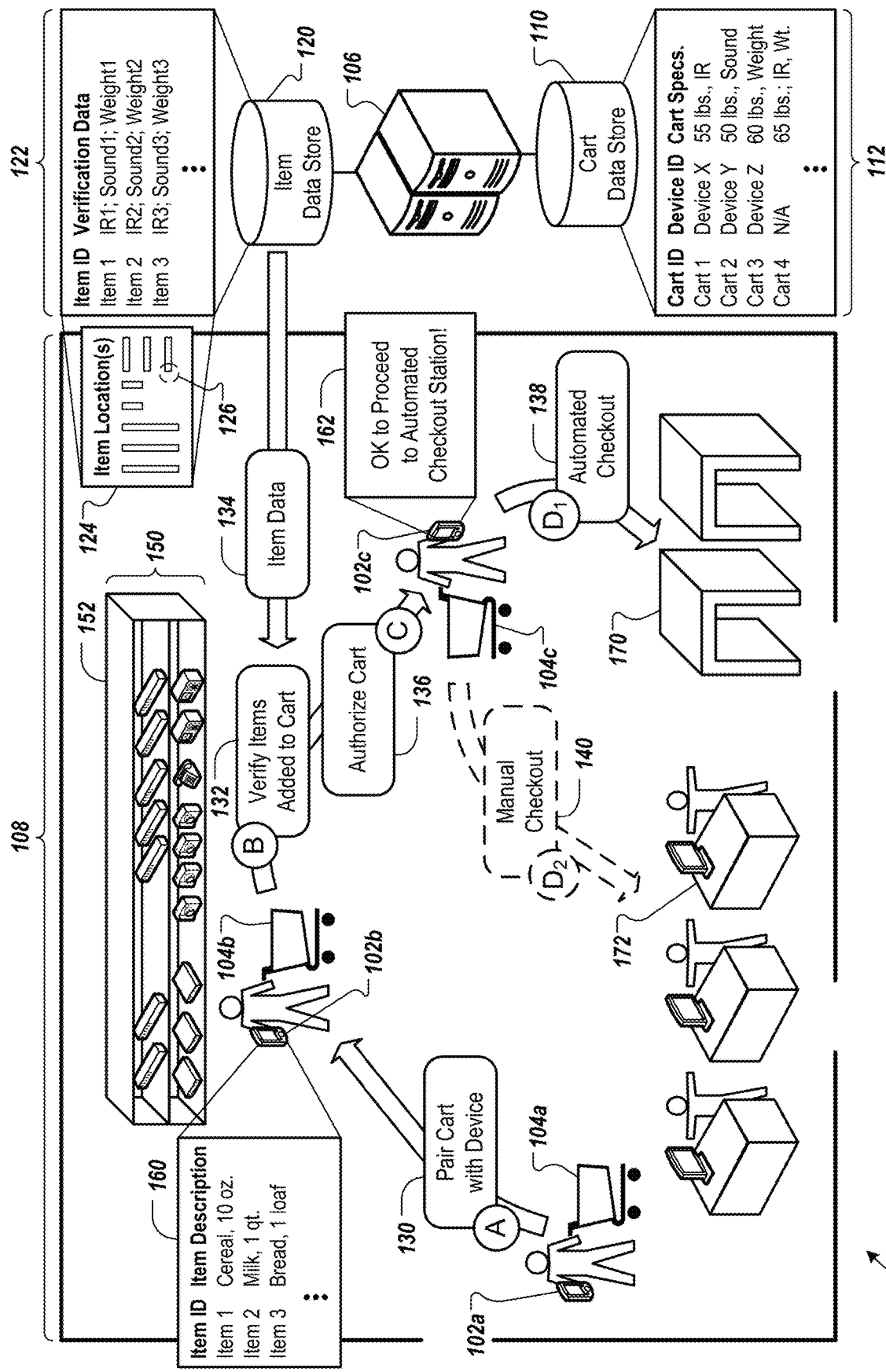
FIG. 1 is a conceptual drawing of an example retail environment, and an example system for verifying items placed in physical shopping carts.

FIG. 1 is a conceptual drawing of an example shopping environment 108, and an example system 100 for verifying items placed in physical shopping carts, as represented in example stages (A) to (D). Stages (A) to (D), for example, may occur in the illustrated sequence, a different sequence, and/or two or more stages (A) to (D) may be concurrent. In some examples, one or more stages (A) to (D) may be repeated multiple times during a shopping trip.

The shopping environment 108 can be a physical retail store, warehouse, or another sort of facility in which various items 150 (e.g., physical products) are stored in various storage units 152 (e.g., shelves, racks, bins, etc.) and are available for selection by various system users (e.g., customers, employees, or other system users). In general, each system user can employ a respective personal mobile device and a respective shopping cart while traversing the shopping environment 108 and adding items to their cart. In the present example, a system user employs mobile device 102 (e.g., a smart phone, a digital assistant, a tablet, or another sort of mobile computing device) and shopping cart 104

(e.g., a smart cart, a dolly cart, a shopping basket, or another sort of manually operated or self-guided physical device for conveying items, that includes various computing components and physical sensors) while shopping. The mobile device 102, for example, can communicate with the shopping cart 104 and with a server system 106 during the user's shopping trip. The server system 106, for example, can include and/or communicate with one or more computing servers (e.g., application servers, cloud servers, data servers, etc.). As described in further detail in examples below, communication between the various devices and systems may occur over a communication network and/or may occur over a direct connection.

During stage (A), a shopping cart is paired with a user's mobile computing device. For example, the system 100 can perform operation 130, pairing shopping cart 104 (shown here as cart 104a) with mobile device 102 (shown here as device 102a). Pairing the cart 104 with the mobile device 102, for example, can be initiated when the device 102 detects an identifier of the cart 104, which can be performed by the device 102 in a variety of ways. For example, the user of the mobile device 102 can select an option to scan a cart identifier (e.g., a barcode, a QR code, etc.) on the cart 104, using a mobile application running on the device 102, and can then capture an image of the cart identifier (e.g., using a device camera). As another example, the user of the mobile device 102 can select an option to wirelessly obtain the cart identifier, using the mobile application, and can then follow instructions presented by the mobile application regarding how to position the device 102 relative to the cart 104 to obtain the cart identifier wirelessly. In some implementations, wirelessly obtaining a cart identifier by a mobile computing device can include establishing a local wireless network between the device (e.g., mobile device 102) and a cart (e.g., cart 104). The local network, for example, can be any of a variety of communication networks between the mobile device 102 and the shopping cart 104, such as a WiFi Direct connection, a BLUETOOTH pairing (e.g., BLE pairing), an NFC connection, and/or connections to a common local wireless network (e.g., both the mobile device 102 and the cart 104 being connected to the same WiFi network). Other options for obtaining the cart identifier by the mobile device 102 are also possible. For example, the cart identifier can be obtained by establishing a wired connection between the mobile device 102 and the cart 104 (e.g., a tethered connection, such as a wired USB connection).

Once the cart identifier has been obtained, the mobile device 102 can transmit a cart association request to the server system 106 (e.g., through a WiFi network, or another suitable network of the retail environment 108). The cart association request, for example, can include the obtained cart identifier of the shopping cart 104, and can include information that uniquely identifies the mobile device 102. In response to receiving the cart association request, for example, the server system 106 can update cart data 112 in a cart data store 110 (e.g., a data server, a file system, or another suitable type of data storage device or system) to include data that associates the shopping cart 104 with the mobile device 102. In the present example, the cart data store 110 can include additional shopping cart specifications, such as a weight of a cart, and types of item verification sensors that may exist on the cart (e.g., infrared (IR) sensors, sound sensors, weight sensors, cameras, or other suitable sensors). Such additional information can be used by the system 100 to facilitate verification of items being added to the shopping carts and/or a final verification of cart contents, as described in further examples below.

During stage (B), items added to a shopping cart are verified. For example, the system 100 can perform operation 132, in which operations of the mobile device 102 (shown here as device 102b), the shopping cart 104 (shown here as cart 104b), and the server system 106 are coordinated to verify one or more items 150 as the items are added to the cart 104. A user can select one or more of the items 150 from its storage unit 152, for example, and can scan the item(s) with the mobile device 102, using a mobile application (e.g., a shopping application) running on the device 102. Item scanning, for example, can be performed by capturing an image of an identifier of a selected item (e.g., a barcode, a QR code, etc.) using a camera of the mobile device 104, by scanning a Radio Frequency Identification (RFID) tag of the selected item using an RFID scanner of the mobile device 104, or by performing another sort of item scan.

Once the item identifier has been obtained (an optionally, once an item quantity has been specified by the user), the mobile device 102 can transmit an item data request to the server system 106 (e.g., through a WiFi network, or another suitable network of the retail environment 108). The item data request, for example, can include the obtained item identifier of a selected item 150. In response to receiving the item data request, for example, the server system 106 can access an item data store 120 (e.g., a data server, a file system, or another suitable type of data storage device or system) that can include, in association with unique identifiers for various types of items (e.g., products in the retail environment 108), item data 122 for the items. The item data 122, for example, can include various types of item verification data for each item, each type of item verification data corresponding to a different type of item verification sensor that may exist on a shopping cart (e.g., infrared (IR) sensors, sound sensors, weight sensors, cameras, or other suitable sensors). In addition to the item verification data, for example, the item data 122 can include other item data in association with an item identifier, such as an item price, an item description, an item weight, an image of the item, one or more known locations of the item in the retail environment 108 according to a planogram and/or a heat map, etc. In the present example, the server system retrieves and provides item data 134 (e.g., including some or all of the item verification data and other item data that pertains to the selected item 150) to the mobile device 102 and/or the shopping cart 104, from the item data store 120.

In some implementations, retrieving and providing item verification data can be based at least in part on shopping cart specifications of a shopping cart that is paired with a mobile device that requested the data. For example, the item data request can include, along with the obtained item identifier of the selected item 150, an identifier of the shopping cart 104 that is paired with the mobile device 102, and/or an identifier of the device 102. Upon receiving the identifier of the shopping cart 104 and/or the identifier of the device 102, for example, the server system 106 can access the cart data store 110 and retrieve (and optionally, cache for later use) shopping cart specifications that correspond to the shopping cart 104. As another option, the mobile device 102 can provide the server system 106 with the shopping cart specifications that correspond to the paired shopping cart 104 as part of the item data request. After receiving the shopping cart specifications for the shopping cart 104 (e.g., including data that indicates each type of sensor that exists on the cart), for example, the server system 106 can retrieve and provide item verification data that corresponds to the selected item 150 and to the types of item verification sensors that exist on the cart 104. By retrieving and providing verification data that pertains to a particular cart, for example, an amount of data transmitted over the network(s) can be reduced, along with data transmission times.

In some implementations, retrieving and providing item verification data (and optionally, other item data) for an item can be performed without the item having been scanned. For example, the mobile device 102 can be associated with a user account that has a historical purchase history maintained by the server system 106. When the mobile device 102 and the shopping cart 104 are paired, for example, the server system 106 can retrieve and provide item verification data (and optionally, other item data) that pertains to a subset of the items 150 that have been frequently purchased by the user, based on the historical purchase history associated with the user's account. As another example, as the mobile device 102 moves throughout the retail environment 108, device location information (e.g., based on wireless signal strength data, Global Positioning System (GPS) data, or other suitable data) can be provided to the server system 106. In response to receiving the device location information, for example, the server system 106 can retrieve and provide item verification data (and optionally, other information) that pertains to a subset of the items 150 that are in proximity to the mobile device 102 (e.g., based on item location information maintained in the item data store 120).

By using the server system 106 to retrieve and provide verification data (and optionally, other item data) as the data is used (and/or, in anticipation of the data being used), data updates can be centrally managed. For example, the retail environment 108 may include tens of thousands of different types of items 150, and the relevant verification data and other product information for such items can change over time. When changes occur, for example, the item data store 120 and/or the cart data store 110 can be updated, and the mobile device 102 and/or the shopping cart 104 can receive current data for particular items upon request. Thus, the data storage requirements of both the mobile device 102 and the shopping cart 104 can be reduced, along with an amount of data transmitted over the network(s).

Once the item data 134 has been retrieved and provided by the server system 106, for example, the mobile device 102 and/or the shopping cart 104 can receive the data 134, and can use the data 134 to verify whether the item 150 scanned by the mobile device 102 is actually added to the cart 104, according to item verification sensors of the cart 104. In general, item verification data of a particular type can be used by item verification sensors of a corresponding type to verify an item. For example, infrared (IR) verification data (e.g., data that defines a size/shape of an item, as detected by IR sensors when the item enters the cart 104) can be used to verify the item 150 according to the shopping cart's IR sensors. Example techniques for verifying an item according to IR sensor data are described in U.S. Application No. 63/276,386, which is herein incorporated by reference. As another example, sound verification data (e.g., data that defines a sound that the item produces when placed in the cart 104, as detected by sound sensors) can be used to verify the item 150 according to the cart's sound sensors (e.g., one or more microphones). Example techniques for verifying an item according to sound sensor data are described in U.S. Application No. 63/276,462, which is herein incorporated by reference. As another example, weight verification data (e.g., data that defines a weight bump that the item generates when placed in the cart 104, as detected by weight sensors) can be used to verify the item 150 according to the cart's weight sensors (e.g., one or more scales). Example techniques for verifying an item according to weight sensor data are described in U.S. Application No. 63/276,474, which is herein incorporated by reference. Other types of item verification data and corresponding sensors are possible, and the various sensor types can be used singly or in combination with other sensors (and optionally, in combination with item location data) to verify scanned items. Item verification can include determining whether item verification data for a scanned item matches data collected by the corresponding sensors, as described in further detail in examples below.

In some implementations, item location data can be used to verify an item. For example, the item data 134 can include item location data 124 (e.g., including one or more item locations 126 according to a planogram and/or a heat map of past item scans by other mobile device users) for the item 150. As items are scanned by multiple different users in the retail environment 108, potentially through the use of multiple different applications (e.g., customers using a shopping application, employees using an inventory application, etc.), location data for each item scan can be determined (e.g., based on wireless signal strength data, Global Positioning System (GPS) data, or other suitable location data provided through use of a scanning device) and can be stored (e.g., by the item data store 120) for use in aggregating and providing the item location data 124. In general, location data for an item that has been collected within a certain period of time (e.g., the past day, the past week, the past month, or another suitable period of time) can be used for aggregating and providing item location data. If an item becomes available at a new location, for example, the new location can eventually be recognized as a valid location for the item, as the item is scanned at the new location by multiple different users over time. Item verification can include determining whether a location of a current scan of an item matches an expected item location 126 for the item according to its item location data 124 (e.g., the current scan location is within a threshold distance of five feet, ten feet, twenty feet, or another suitable threshold distance of the expected item location). When the location of the current item scan matches the expected item location 126 according to its item location data 124, for example, the scanned item can be verified with a higher level of confidence, whereas the scanned item may be unverified (or verified with a lower level of confidence) when the location of the current item scan does not match the expected item location. By considering the location of a current item scan relative to an expected item location according to its item location data when verifying an item, for example, deceptive practices (e.g., switching a high-cost item with a low-cost item having a similar physical profile) can be potentially be detected and prevented.

In some implementations, once an item has been successfully or unsuccessfully verified, a user can be notified through output generated by the mobile device 102 and/or the shopping cart 104. In the present example, the mobile device 102 (shown here as device 102*b*) can add the selected item (e.g., one of items 150) to a virtual shopping cart maintained by the device 102 and/or servers 106, which can be presented to the user at interface 160. As another example, the shopping cart 104 can provide an indication (e.g., visual, sonic, and/or tactile) of successful and/or unsuccessful item verification. Additional user notifications and interfaces are described in further detail in examples below.

In some implementations, a user may not be notified of an item being successfully or unsuccessfully verified. For example, item verification results can be maintained in association with a virtual shopping cart (e.g., with a scanned item being added to the cart, along with its verification status), without providing the item verification results to the user. By maintaining item verification results in the background in association with the user's virtual shopping cart, for example, a relatively uninterrupted shopping experience can be facilitated, while tracking the verification statuses of items that have been added to the cart. The verification statuses of each item in the virtual shopping cart can be aggregated, possibly with one or more other factors (e.g., a user's purchase history, a user's reputation score, etc.) to determine an overall verification status of the shopping cart 104. A high user reputation score, for example, can indicate a high level of virtual cart accuracy for the user for previous shopping trips (e.g., a virtual cart being shown to accurately represent the contents of a physical cart during checkout), whereas low reputation scores can indicate a low level of virtual cart accuracy for the user for previous shopping trips (e.g., a virtual cart being shown to not accurately represent the contents of a physical cart during checkout). The overall verification status of the shopping cart, for example, can be used as a factor in directing the user to an appropriate station during a checkout process. As another example, an option to scan items while shopping (and to potentially use an automated checkout station) can potentially be removed before a shopping trip is completed, if a combination of the overall verification status of a shopping cart and a user's reputation score is below a threshold value.

During stage (C), a shopping cart may potentially be authorized for automated checkout. For example, the system 100 can perform operation 136, in which a determination of whether the user of the mobile device 102 (shown here as device 102*c*) and the shopping cart 104 (shown here as cart 104*c*) is authorized to proceed to an automated checkout station 170, or is to proceed to a manual checkout station 172. The automated checkout station 170, for example, can include RFID scanners, weight sensors, and/or high resolution cameras that can be used to determine whether the contents of the shopping cart 104, as tallied by the mobile device 102, correspond to what is being detected by the station 170. For example, the station 170 can measure the weight of the cart 104 and its contents, and determine whether the measured weight is within a threshold of the expected weight of the cart 170 and its contents, according to the mobile device tally. As another example, the station can use its RFID scanners to verify items with RFID tags that automated device sensors (e.g., IR scanners) are unable to verify with confidence. As another example, the station can use its cameras to capture one or more images of the cart 104 and its contents. If the cart 104 is validated across one or more of these signals, the customer may be automatically charged for the tallied contents and permitted to simply depart the retail environment 108. The manual checkout station 172, for example, can be a Point of Sale (POS) terminal at which items are removed from the shopping cart 104, an employee of the retail environment 108 individually scans the items to tally a total price, and the user provides a payment before departing the environment 108.

In general, determining whether a shopping cart is authorized for automated checkout can include determining a cart accuracy score for a virtual shopping cart, from verification results associated with items that have been placed in the shopping cart. Determining the cart accuracy score used for cart authorization, for example, can be based on a quantity of items in the cart (e.g., an absolute quantity, a percentage quantity, etc.) that have been verified, and/or an aggregated confidence score (e.g., averaged and/or weighted) for items in the cart, as described in further examples below. In some implementations, one or more additional authorization factors (e.g., a user's purchase history, a user's reputation score, etc.) can be considered when determining whether a shopping cart is authorized for automated checkout. For example, if a user is a regular customer of a store, and/or is a user of one or more additional services provided by the store (e.g., credit services, loyalty services, etc.), and/or has a high reputation score, a lower cart accuracy score may qualify the user for an automated checkout—whereas if the user is not a regular customer, and/or is not a user of additional services, and/or has a low reputation score, a higher cart accuracy may qualify the user for the automated checkout. In the present example, the shopping cart 104 is authorized for automated checkout (e.g., the virtual cart's accuracy score meets a threshold value), and the user is notified through output generated by the mobile device 102, which can be presented to the user at interface 162. At stage ($D_1$), for example, the user can proceed with the mobile device 102 and the shopping cart 104 to the automated checkout station 170 to perform an automated checkout operation 138. However, if the shopping cart 104 were not to be authorized for automated checkout (e.g., the virtual cart's accuracy score does not meet a threshold value), the user would be notified through output generated by the mobile device 102, and at stage ($D_2$), for example, the user could proceed with the mobile device 102 and the shopping cart 104 to the manual checkout station 172 to perform a manual checkout operation 140.

In some implementations, an additional item check may be performed after an automated checkout operation. For example, after the automated checkout operation 138 is performed on the shopping cart 104 (at stage ($D_1$)), the user can be presented with further instructions (e.g., through output presented by the mobile device 102, through an indicator on the shopping cart 104, and/or through output presented by the automated checkout station 170) for completing the shopping trip. If the automated checkout station 170 confirms that the user's virtual shopping cart accurately represents the contents of the physical shopping cart 104, for example, the user's transaction can be finalized and the user can be permitted to depart the retail environment 108. If the automated checkout station 170 is unable to confirm that the user's virtual shopping cart accurately represents the contents of the physical shopping cart 104 within a threshold level of certainty, for example, an employee of the retail environment 108 can be directed to perform an additional item verification (e.g., by scanning one or more random items, high value items, and/or specifically unverified items in the shopping cart 104). If the shopping cart 104 passes the additional item verification, for example, the user's transaction can be finalized and the user can be permitted to depart the retail environment 108. If, however, the shopping cart 104 does not pass the additional item verification, for example, the user can be directed to the manual checkout station 172 to perform the manual checkout operation 140. Similarly, if the automated checkout station 170 determines that the user's virtual shopping cart does not accurately represent the contents of the physical shopping cart 104 (e.g., one or more items were detected by the automated checkout station 170 as being in the shopping cart 104 that are not in the user's virtual shopping cart), the user can be directed to the manual checkout station 172 to perform the manual checkout operation 140.

In some implementations, upon completion of a shopping trip, a user's transaction may be automatically finalized and the user may be permitted to depart without first proceeding to an automated checkout station or a manual checkout station. For example, if a virtual cart's accuracy score meets a threshold value and one or more additional authorization factors pertain to the user (e.g., the user's reputation score meets a threshold value and/or the user subscribes to a loyalty program and/or uses credit services of the store), the user can be provided with a notification (e.g., on the mobile device 102 and/or the shopping cart 104) to confirm the transaction. After the user's transaction for the shopping trip is finalized, for example, the user can be permitted to simply depart the store.

Figure 2:
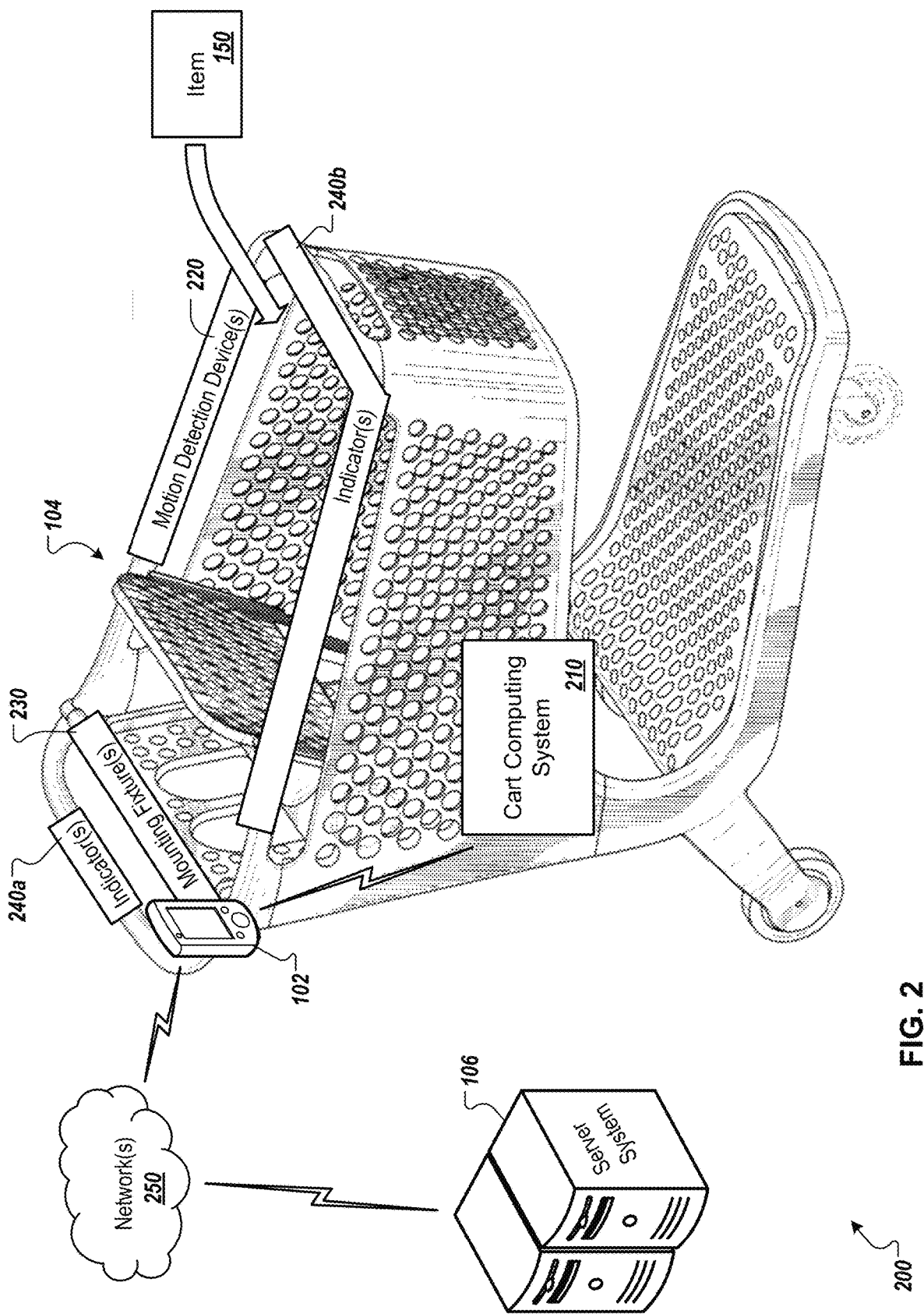
FIG. 2 depicts an example system for verifying items placed in physical shopping carts.

FIG. 2 depicts an example system 200 for verifying items placed in physical shopping carts. The system 200, for example, can include mobile device 102 (shown in FIG. 1), shopping cart 104 (also shown in FIG. 1), and server system 106 (also shown in FIG. 1), in communication over network(s) 250. The network(s) 250, for example, can include one or more communication networks, including a LAN (local area network), a WAN (wide area network), and/or the Internet. In addition to or instead of communicating over network(s) 250, in some implementations, devices, carts, and/or servers may communicate directly using an appropriate communications protocol (WiFi, BLUETOOTH low energy (BLE), near-field communication (NFC), etc.). For example, the mobile device 102 can perform a wireless pairing operation (e.g., WiFi Direct pairing, BLUETOOTH low energy (BLE) pairing, near-field communication (NFC) pairing) with the a cart computing system 210 of the shopping cart 104 to establish an association with the cart 104.

As shown in FIG. 2, the cart 104 can be a smart cart. In some implementations, the cart 104 can be a preexisting shopping cart in the retail environment 108 that has been modified/updated to include one or more components used for performing the item verification techniques described herein. Since the components used for item verification may be low cost, modifying existing shopping carts with the components can be simple and inexpensive relative to producing new carts.

The shopping cart 104 can include optional mounting fixture(s) 230 (e.g., on or near a cart handle), optional indicator(s) 240a-b (e.g., on or near the cart handle and/or around a top perimeter of the cart), the cart computing system 210, and motion detection device(s) 220. The mounting fixture(s) 230 can have a housing or other configuration that can removably receive the mobile device 102 (e.g., smart phone, digital assistant, tablet, etc.) of a user. The housing or other configuration can be sized to fit mobile devices of varying sizes. The mounting fixture(s) 230 can also be located at one or more other regions of the cart 104 to facilitate case of access, attachment, and removal of the mobile device 102 from the cart 104.

Figure 3:
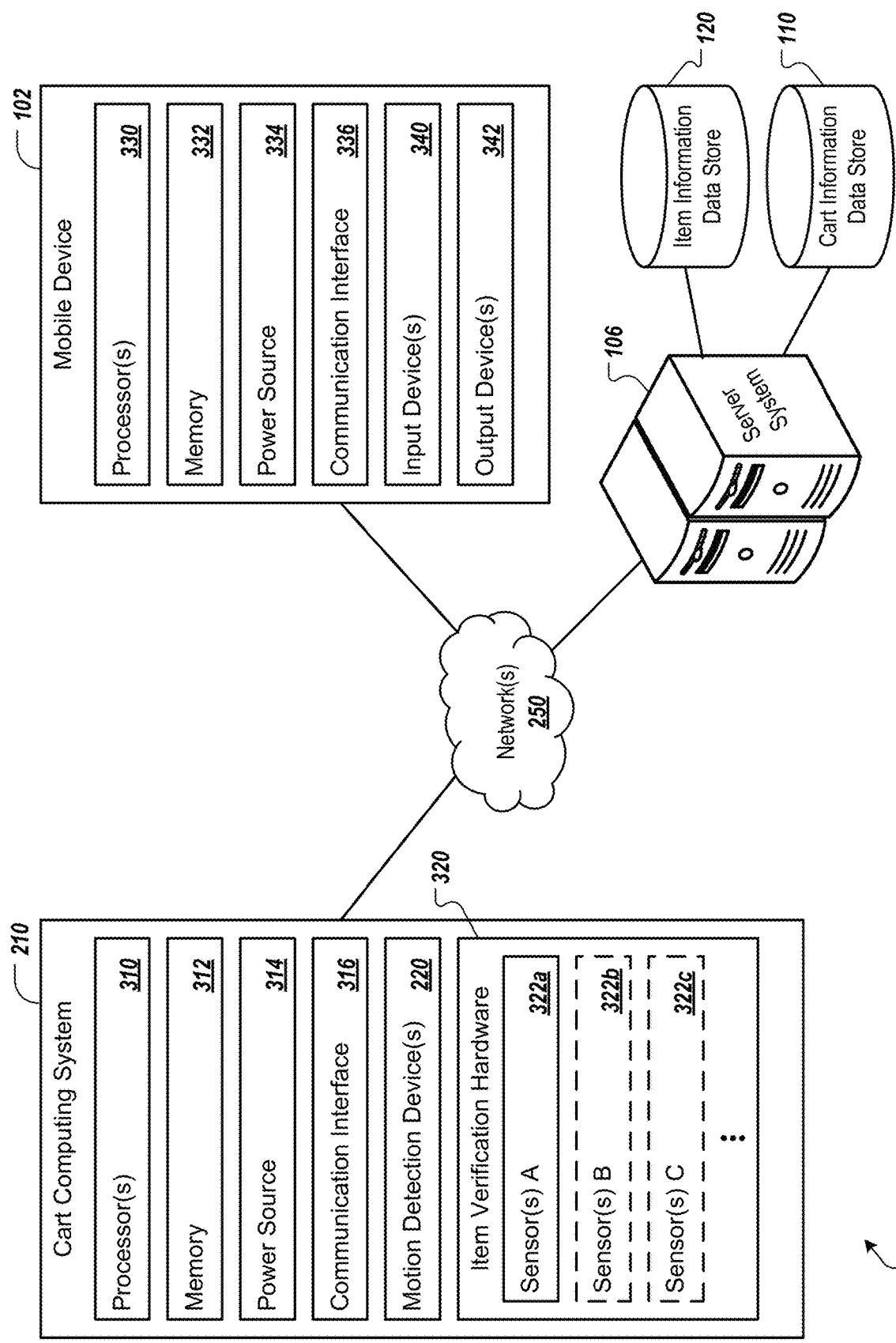
FIG. 3 depicts an example system for verifying items placed in physical shopping carts.

The cart computing system 210, as described further in reference to FIG. 3, can include processor(s), memory, a power source, and a communication interface. In addition, the cart computing system 210 can be in communication (e.g., wired, wireless) with the mobile device 102, and can include and/or be in communication with the motion detection device(s) 220 and/or the indicator(s) 240a-b. In some implementations, in addition to providing power to the cart computing system 210, the power source of the cart computing system 210 can provide power to one or more additional components of the shopping cart 104, including but not limited to the motion detection device(s) 220 and/or the indicator(s) 240a-b. In some implementations, the power source can also provide power to the mobile device 102 (e.g., to charge the device 102) while the device 102 is mounted at the mounting fixture(s) 230.

The motion detection device(s) 220, for example, can include one or more sensors along the top perimeter of the shopping cart 104 (e.g., directed toward an interior of the cart), and can be configured to detect motion indicative of an item (e.g., item 150) being placed in or removed from the cart 104. In some implementations, the motion detection device(s) 220 of the shopping cart 104 and/or the cart computing system 220 can include one or more optical sensors (e.g., infrared (IR) sensors) that are sufficiently spaced to detect and track vertical and rotational motion of the item 150 as it passes through a horizontal plane defined by the top perimeter of the cart 104. The optical sensors, for example, can be configured to translate movement and velocity of items entering or leaving the cart 104, in a z-dimension.

The indicator(s) 240a-b, for example, can include one or more output devices (e.g., indicator lights, speakers, tactile devices, etc.) on or near the handle of the shopping cart 104 and/or around a top perimeter of the cart (e.g., a ring of upward-facing indicator lights). In general, the indicator(s) 240a-b can be configured to convey verification status information that pertains to an addition of an item to the cart 104, and/or an overall state of the cart. In some implementations, the indicator(s) 240a-b can be configured to provide verification status information to a user of the shopping cart 104 instead of, or in addition to, verification status information provided by the mobile device 102. For example, the indicator(s) 240a-b can include a first indicator that indicates a successful item verification (e.g., a green light, a chime tone, etc.), and can include a second indicator that indicates an unsuccessful item verification (e.g., a red light, a buzzer tone, etc.). In some implementations, the indicator(s) 240a-b can be configured to provide information that indicates an overall state of the shopping cart 104. For example, the indicator(s) 240a-b can include different indicators (e.g., different colored lights, different light intensities, and/or different flashing light patterns) that indicate whether the cart 104 is active, is inactive, is malfunctioning, is waiting for an item to be added, has detected that an item has been added (e.g., either with or without an indication of whether the item has been successfully or unsuccessfully verified), and/or other suitable cart states. As another example, the indicator(s) 240a-b can include different indicators for directing a user during a checkout process. For example, the indicator(s) 240a-b can include a first indicator (e.g., a green light) that indicates that a transaction is complete and that a customer may leave the store, a second indicator (e.g., a yellow light) that indicates that a user is to proceed to a station where a partial check of the cart contents is performed (e.g., by an employee), and a third indicator (e.g., a red light) that indicates that a user is to proceed to a manual checkout station where the entire cart contents are determined and the transaction is completed. In some implementations, the indicator(s) 240a-b can be an LED light bar and/or an LED light strip. One or more other light configurations can be used for the indicator(s) 240a-b.

FIG. 3 depicts an example system 300 for verifying items placed in physical shopping carts. The system 300, for example, can include cart computing system 210 (also shown in FIG. 2), mobile device 102 (also shown in FIG. 1 and FIG. 2), and server system 106 (also shown in FIG. 1 and FIG. 2), in communication over one or more network(s) 250. The cart computing system 210, for example, can be part of a shopping cart, such as the shopping cart 104 (shown in FIG. 1 and FIG. 2). In some implementations, the cart computing system 210 can include one or more components that are separate from a shopping cart and/or in communication with one or more components of the shopping cart (e.g., a cloud-based system and/or service). In such a scenario, the cart computing system 210 can, for example, perform operations for multiple shopping carts. The cart computing system 210 can include processor(s) 310, memory 312, a power source 314, a communication interface 316, motion detection device(s) 220 (also shown in FIG. 2), and item verification hardware 320. The processor(s) 310 can be configured to execute one or more of the processes/techniques described herein.

The cart computing system 210 can be configured to activate the item verification hardware 320 in response to identification of the item by the mobile device 102 (e.g., through a scan of the item, a captured image of the item, etc.) and/or when an item is detected as entering the shopping cart 104. For example, the motion detection device(s) 220 can provide a notification of when the item enters the shopping cart to the cart computing system 210, which can then activate one or more sensors 322*a-c* of the item verification hardware 320. The motion detection device(s) 220, for example, can include one or more sensors attached to the shopping cart 104, to collect information about an item as it passes through a top horizontal plane of the cart and enters the cart. For example, the motion detection device(s) 220 can include IR emitters, IR sensors, and IR optical flow sensors. The IR emitters and IR sensors can be alternating in a single line along a top perimeter of the shopping cart 104, for example, while the IR optical flow sensors can be interspersed along the single line at the top perimeter of the shopping cart 104 at predetermined distances/intervals. The IR emitters can be activated to generate light across the top horizontal plane of the shopping cart 104 as the item passes through the plane and into the cart. The generated light can be detected by the IR sensors as IR data, which can be used to determine when an item enters and/or exits the shopping cart 104, for example, and/or to generate a shadow map of the item.

In some implementations, data from the motion detection device(s) 220 can be used to determine a velocity of an item as it enters a shopping cart. As the item moves through the top horizontal plane and into the shopping cart 104, for example, the IR optical flow sensors can detect rotational and/or motion data of the item, which can be used to determine velocity of the item as it moves into the cart. Because of variable distances between the IR optical flow sensors and the item, a relative translation rate or other data received from the IR optical flow sensors may not directly translate into velocity of the item. In some implementations, trigonometric functions can be used to determine relative item and IR optical flow sensor positioning over time. For example, a curve can be generated that indicates a position of the item over time as the item passes through the top horizontal plane of the shopping cart 104. The curve, for example, can also be a map of time values corresponding to a constant change in item position, for example. A velocity of the item can be identified using the curve, for example.

The item verification hardware 320, for example, can include one or more sensors (e.g., sensors 322*a-c*) that can be used to detect an item that is placed in (or removed from) the shopping cart 104, to measure various physical properties of the detected item, and to provide item data based on the measurements. For example, each of the sensor(s) 322*a-c* can be a different type of sensor that measures a different physical property, such as one or more IR sensors (e.g., sensors of the motion detection device(s) 220 and/or similar sensors) for measuring a size/shape of an item, one or more sound sensors (e.g., microphones) for measuring a sound produced by the item, one or more weight sensors (e.g., scales) for measuring a weight bump produced by the item, one or more cameras for visually recognizing the item, or other suitable sensors. The item verification hardware 320, for example, can include a single type of sensor, or can include a combination of multiple different sensor types. In some implementations, data from the motion detection device(s) 220 can be used to perform item verification. For example, sensors of the motion detection device(s) 220 can be sensors of the item verification hardware 320 (e.g., any of the sensors 322*a-c*). For example, data from the motion detection device(s) 220 (e.g., IR sensor data) can be used to reconstruct an item in multidimensional (e.g., 3D) space to determine a size/shape of the item.

The mobile device 102, for example, can be a smart phone, digital assistant, tablet, or other sort of mobile computing device. Functionality described herein can be presented in a mobile application or other software suite presented at the mobile device 102. The mobile device 102 can be used to scan items that a customer desires to purchase, and can be used by the customer to apply offers, promotions, and/or coupons to their transaction. A virtual shopping cart can be accessible at the mobile device 102 and can include various items that the customer scans with the mobile device 102 and puts in their shopping cart 104. In some implementations, the virtual shopping cart can also include virtual products that the customer selects from an online shopping application presented at the mobile device 102.

The mobile device 102 can include processor(s) 330, memory 332, a power source 334, a communication interface 336, input device(s) 340, and output device(s) 342. The processor(s) 330 can be configured to execute one or more of the processes/techniques described herein. The input device(s) 340 can include one or more of a touch screen display, keyboard, mouse, microphone, and/or imaging sensors, and can receive user input. For example, a user can scan an identifier on packaging of an item using a camera (e.g., one of the input device(s) 340) of the mobile device 102. As another example, the user can use a Radio Frequency Identification (RFID) scanner (e.g., another of the input device(s) 340) of the mobile device 102 to scan an RFID tag of the item. The user can also provide input indicating an item quantity on a touch screen display of the mobile device 102, for example. The output device(s) 342 can include display screens, speakers, and/or other types of devices for delivering content/information to a user. For example, the output device(s) 342 can present information in graphical user interface (GUI) displays at the mobile device 102. The output device(s) 342, for example, can be an LCD touch screen that can present an application or software suite that allows a user to scan items, add items to their virtual shopping cart, access account information, review transactions, and/or complete transactions. The output device(s) 342 can also provide notifications, messages, and/or alerts to the user indicating whether an item is verified. The output device(s) 342 can provide one or more other forms of output to the user, as described herein.

The server system 106 can include one or more computing servers (e.g., application servers, cloud servers, data servers, etc.). For example, the server system 106 can communicate with, and can store, update, and retrieve data in the cart data store 110 and the item data store 120. The cart data store 110, for example, can maintain information associated with various shopping carts in the retail environment 108 (e.g., cart identifiers, current pairings with mobile devices, cart specifications, etc.). The item data store 120, for example, can maintain information associated with various items in the retail environment 108 (e.g., item identifiers, verification data associated with the items, item prices, item descriptions, item weights, item images, item locations, available item quantities, etc.).

Figure 4A:
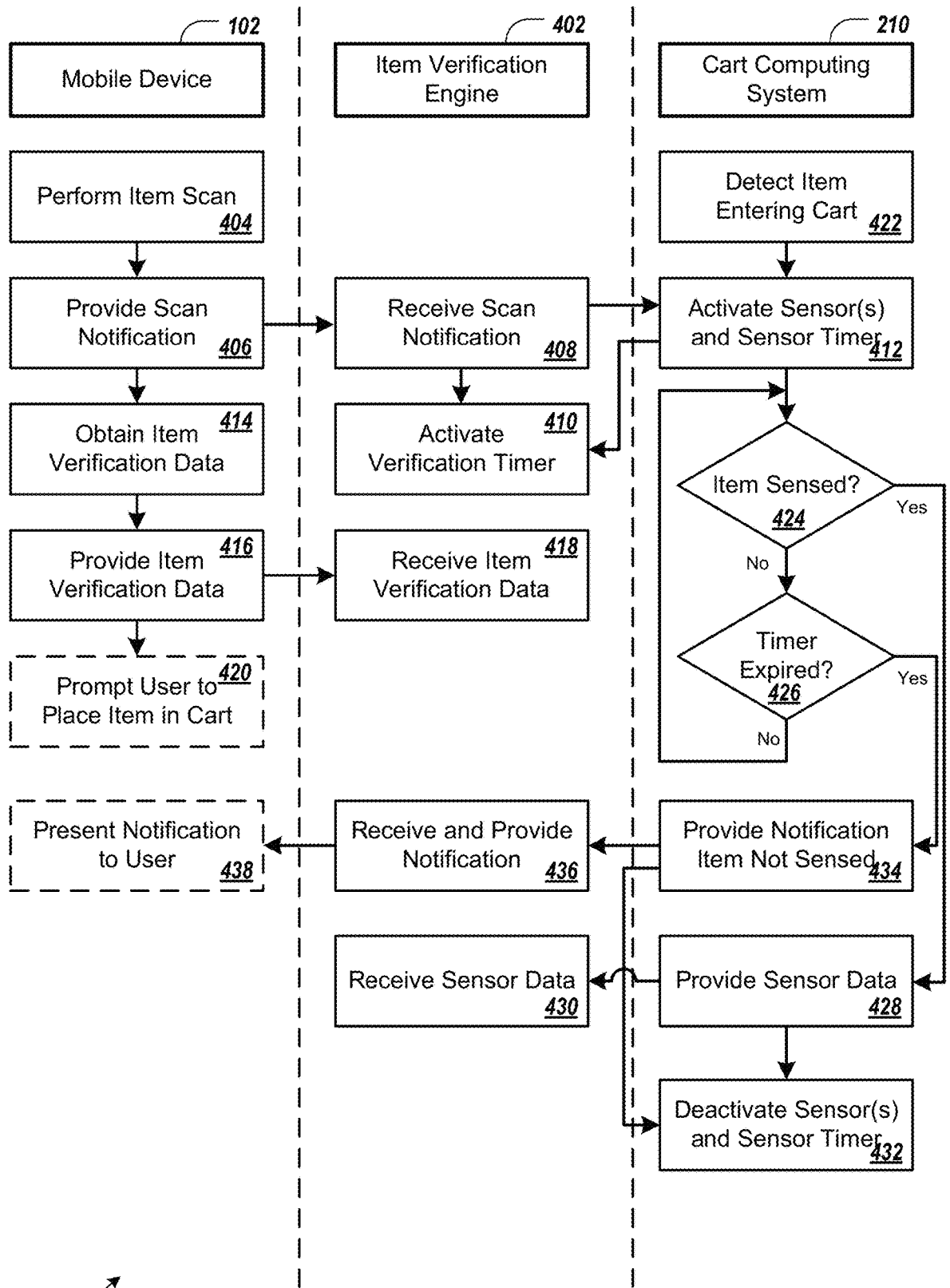
FIGS. 4A-B comprise a flow diagram of an example technique for verifying items placed in physical shopping carts.
Figure 4B:
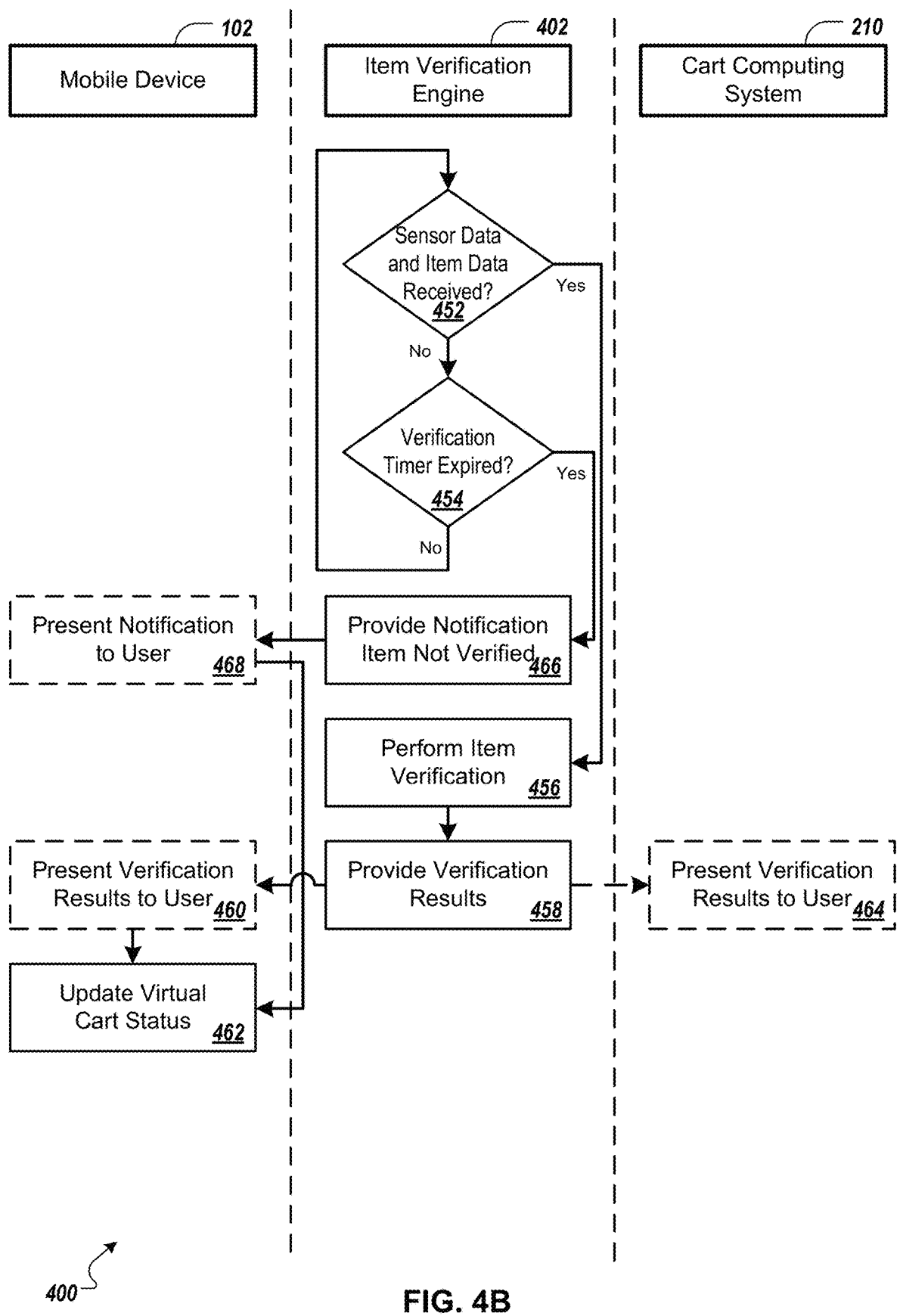

FIGS. 4A-B comprise a flow diagram of an example technique 400 for verifying items placed in physical shopping carts. The example technique 400, for example, includes coordinated operations of a mobile device (e.g., mobile device 102, also shown in FIGS. 1-3) and a cart computing system (e.g., cart computing system 210, also shown in FIG. 2 and FIG. 3). In the present example, some operations of the example technique 400 are described with reference to an item verification engine 402, which can be executed by the mobile device 102 or the cart computing system 210. Optionally, the item verification engine 402 may be executed by the server system 106, with the mobile device 102 forwarding sensor data from the cart computing system 210 to the server system 106, and with the server system directly obtaining item verification data from the item data store 120 and not providing the item verification data to the mobile device 102. In general, the example technique 400 is not a linear process, in that operations may be triggered in response to item scans performed by the mobile device 102 and/or by sensor readings by the cart computing system 210. Also, since item verification data may be retrieved by the server system 106 and provided to the mobile device 102 and/or cart computing system 210 in response to an item scan, for use in verifying an item placed in the shopping cart 104, the item verification data may or may not be available to the verification engine 402 before sensor data is available. For example, a user may scan an item using the mobile device 102, then place the item in the shopping cart 104 before or after the verification data for the item happens to arrive from the server system 106. To provide a smoother shopping experience for the user, for example, various data caching techniques and timer activation techniques can be employed to handle data transmission variances, such that the user is not inconvenienced by a strictly linear process (e.g., a process in which an item is to be placed in a cart only when item verification data is available).

In a regular scenario, the mobile device 102 is used to perform an item scan at 404. Referring to FIG. 1, for example, a user of the mobile device 102 can select an item 150 from the storage unit 152, and can scan the item 150 with the device 102. Optionally, the device 102 can provide a user interface control through which a user can specify a quantity of items to be added to the shopping cart 104. After performing the item scan and optionally receiving an item quantity specified by the user), for example, the mobile device 102 can provide a scan notification (at 406) to the item verification engine 402 and to the cart computing system 210. At 408, the item verification engine 402 (e.g., executed by the cart computing system 210 or the mobile device 102) can receive the scan notification. In response to receiving the scan notification, for example, at 410, the item verification engine 402 can activate a verification timer (e.g., 5 seconds, 10 seconds, 20 seconds, or another suitable period of time) during which the engine 402 waits for item verification data and sensor data to be received. Further, in response to receiving the scan notification from the mobile device 102, for example, at 412 the cart computing system can activate its various sensors (e.g., the item verification hardware 320, shown in FIG. 3), and can activate a sensor timer (e.g., 5 seconds, 10 seconds, 20 seconds, or another suitable period of time) during which the cart computing system 210 waits for sensor data to be received, as a result of the item 150 being placed in the shopping cart 104. For implementations in which the cart computing system 210 executes the item verification engine 402, for example, the verification timer and the sensor timer can be the same timer.

According to the regular scenario described above, verification/sensor timers are activated in response to an item scan by a mobile device. However, in an alternate scenario, a user may place an item in a shopping cart without scanning the item, or after performing an unsuccessful scan. To account for such scenarios, for example, the cart computing system 210 can detect an item entering a shopping cart at 422. In response to the cart computing system 210 detecting the item, for example, the cart computing system 210 can activate its various sensors and its sensor timer at 412, and the item verification engine 402 can activate its verification timer at 410. In the present example, to detect the item 150 entering the shopping cart 104, cart computing system 210 can receive data from motion detection device(s) 220 (shown in FIG. 2 and FIG. 3). With both the verification timer and the sensor timer being activated (or a single combined timer in the case of the cart computing system 210 executing the item verification engine), for example, potential problems or uncommon scenarios can be appropriately handled.

By activating a shopping cart's item verification hardware (e.g., including one or more types of sensors) in response to an item scan notification provided by a mobile device and/or when an item is detected as entering the cart, battery power consumed by the item verification hardware can be conserved. For example, some sensors may consume a little power (or no power) while in an inactive mode, and a greater amount of power while actively performing a sensing operation. Further, by activating one or more sensors immediately prior to a time when the sensor(s) are likely to be used and by activating a limited sensor timer, for example, data collected by the sensors can be limited to a time period corresponding to the sensor. Thus, a relatively small amount of sensor data may be cached at any time while potentially waiting for item verification data to be available.

Returning now to the regular scenario, for example, while the verification timer and the sensor timer (or the single combined timer) are activated, the mobile device 102 can obtain item verification data at 414. For example, the mobile device 102 can transmit, to the server system 106, an item data request that includes the item identifier of the item 150, determined from the scan of the item 150. In response to receiving the item data request, for example, the server system 106 can access the item data store 120 (shown in FIG. 1), can retrieve item verification data (and optionally, other item data, such as item price, description, weight, image, etc.) that corresponds to the item identifier in the item data request, and can provide the item verification data (and optionally, other item data) to the mobile device 102. As another example, the mobile device 102 can access cached item verification data (and optionally, other item data) that was received from the server system 106 before the item 150 was scanned. At 416, the mobile device 102 can provide the item verification data received from the server system 106 to the item verification engine 402, and the item verification engine 402 can receive the item verification data at 418. Optionally, at 420, the mobile device 102 can prompt the user to place the item 150 in the cart 104. For example, the mobile device 102 can provide a visual and/or audible message to the user through a mobile application running on the device 102.

While the item verification hardware 320 of the cart computing system 210 is activated and the sensor timer is running, for example, the user can place item 150 in the shopping cart 104. At 424, one or more sensors of the item verification hardware 320 can sense the item 150 being placed in the shopping cart 104 by the user. In response to the item 150 being sensed, for example, the cart computing system 210 can provide the sensor data associated with the item 150 to the item verification engine 402 (at 428), and the cart computing system 210 can deactivate the sensors of the item verification hardware 320 (at 432). At 430, for example, the item verification engine 402 can receive the sensor data from the cart computing system 210, and may proceed to verify the item 150.

In an alternate scenario, the sensor timer may expire (at 426), before an item is sensed. For example, the user may scan an item and not place the item in the shopping cart 104. As another example, the item may be detected as beginning to enter the shopping cart 104 (e.g., the motion detection device(s) 220 may be triggered), but the user may not actually place the item in the cart 104. As another example, one or more sensor devices 322*a-c* of the item verification hardware 320 may malfunction. In such scenarios, for example, the cart computing system 210 can provide a notification (at 434) to the item verification engine 402 that an item was not sensed, and can deactivate the sensors of the item verification hardware 320 (at 432). At 436, for example, the item verification engine 402 can receive the notification that the item was not sensed, and can provide the notification to the mobile device 102. At 438, for example, the mobile device 102 can optionally present an appropriate message to the user based on the notification and/or a current scenario. For example, if an item was detected as entering the shopping cart 104 and the item was not scanned and not sensed, instructions can be provided to the user to scan the item and place the item in the cart. As another example, if the item was scanned and the item was not sensed, a message can be provided to the user to place the item in the shopping cart 104.

Referring now to FIG. 4B, for example, the example technique 400 for verifying items placed in physical shopping carts can continue. In the regular scenario, the item verification engine 402 has received item verification data (at 418), and has received sensor data (at 430). In the present example, the item verification engine 402 can determine (at 452) that the item verification data and the sensor data has been received, can proceed to perform verification of the item (at 456), and can verify that a count of items as indicated by the received sensor data corresponds to a quantity of items specified as being placed in the cart by a user, to determine verification results (e.g., a successful verification of the item 150 based on the item's verification data and the received sensor and/or item location data, or an unsuccessful verification). At 458, for example, the item verification engine 402 can provide verification results to the mobile device 102, and optionally, to the cart computing system 210. At 460, for example, the mobile device 102 can receive the verification results and can optionally present the verification results to the user. For example, the mobile device 102 can present the verification results (and/or a possible option to retry verifying an item or to correct a specified item quantity) through a mobile application running on the device 102. At 462, the mobile device 102 can update a virtual cart status. For example, the mobile device 102 can add data representing a scanned and verified item (e.g., an item identifier, an item price, an item description, an item weight, an item image, an item quantity, an item verification confidence value, and/or other appropriate item data) to a virtual cart maintained by a mobile application running on the device 102. As another example, the mobile device 102 can add data representing a scanned and unverified item to the virtual shopping cart (e.g., along with data that indicates that the item is unverified, such as the item's verification confidence value being under a threshold value for the item). At 464, for example, the cart computing system 210 can optionally present verification results to the user. For example, cart computing system 210 can cause the indicator(s) 240*a-b* to provide information indicative of the verification results (e.g., green light for successful item verification, red light for unsuccessful verification, or another suitable visual, audible, or tactile indicator).

In an alternate scenario, the verification timer may expire (at 454), before item verification data is received. For example, the user may scan an item and place the item in the shopping cart 104, however the verification engine 402 does not receive item verification data for the scanned item before the verification timer expires. In such a scenario, the item verification engine 402, for example, can provide a notification (at 466) that the item is not verified to the mobile device 102. At 468, for example, the mobile device 102 can optionally present an appropriate message to the user based on the notification and/or current scenario. For example, the mobile device 102 can present, through a mobile application running on the mobile device 102, a message that the system was unable to verify the item and/or that potential network issues exist. At 462, the mobile device 102 can update a virtual cart status. For example, the mobile device 102 can add data representing the scanned item to a virtual cart maintained by a mobile application running on the device 102.

Although the present scenarios are primarily directed to the verification of items being added to a physical shopping cart and the updating of a corresponding virtual shopping cart, in some implementations, users may have the option of indicating items to be removed from the physical shopping cart. For example, a user can select an item from a virtual cart presented by a mobile application running on the mobile device 102, and indicate through the application that the item is to be removed from the physical cart. The cart sensors can provide sensor data that results from removal of the item from the physical cart, for example, and the item verification engine 402 can verify whether the item has been actually been removed. After an item has been removed from the physical cart, for example, the item can also be removed from the virtual cart. If an item removal is not successfully verified, for example, a virtual cart's overall accuracy score may be decreased, whereas a successfully verified item removal may have a neutral impact on the accuracy score (other than removing the item's individual verification confidence value from an overall accuracy score for the cart).

Figure 5:
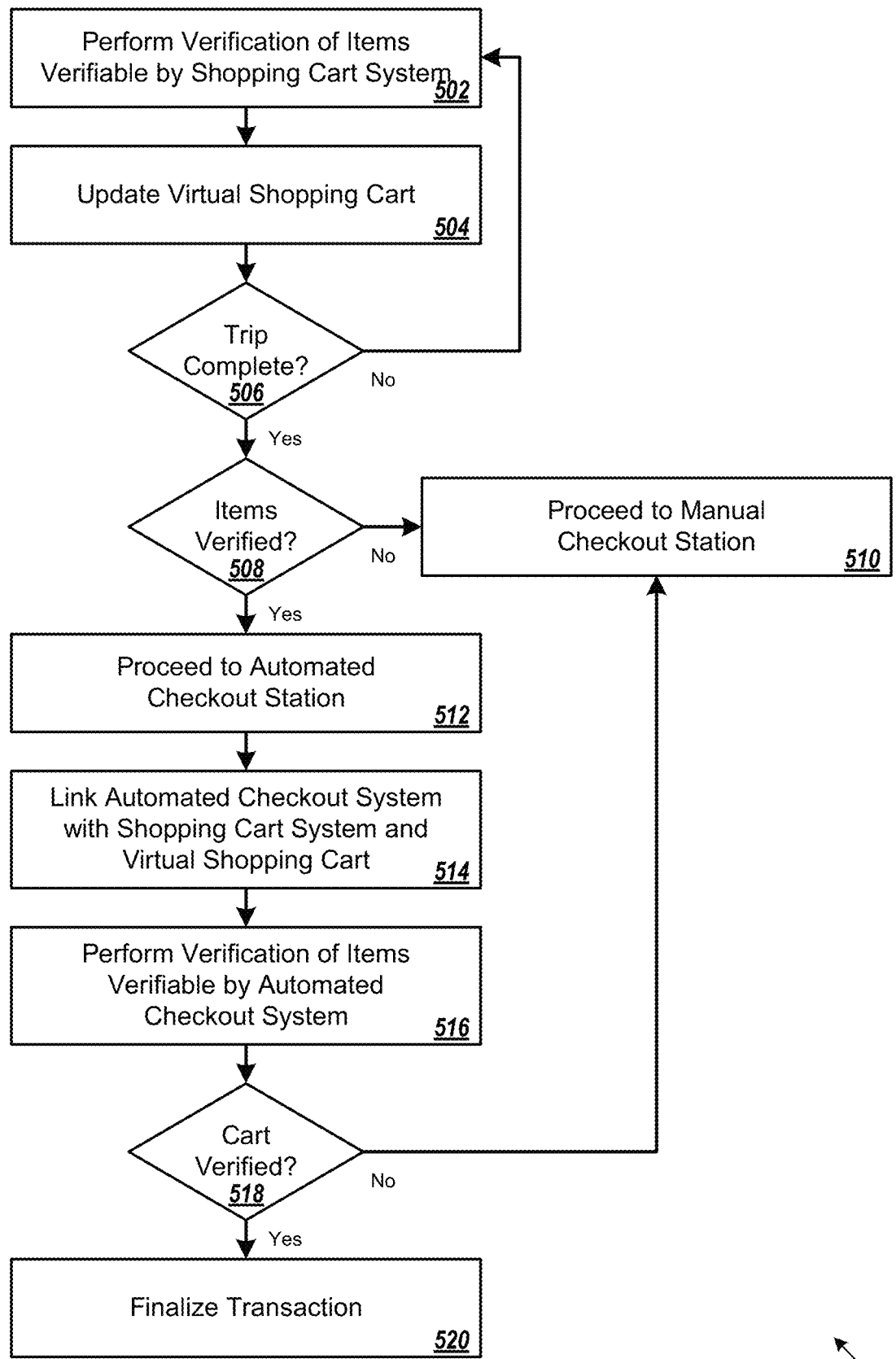
FIG. 5 depicts an example process flow for verifying items by a shopping cart system and an automated checkout system.
Figure 6A:
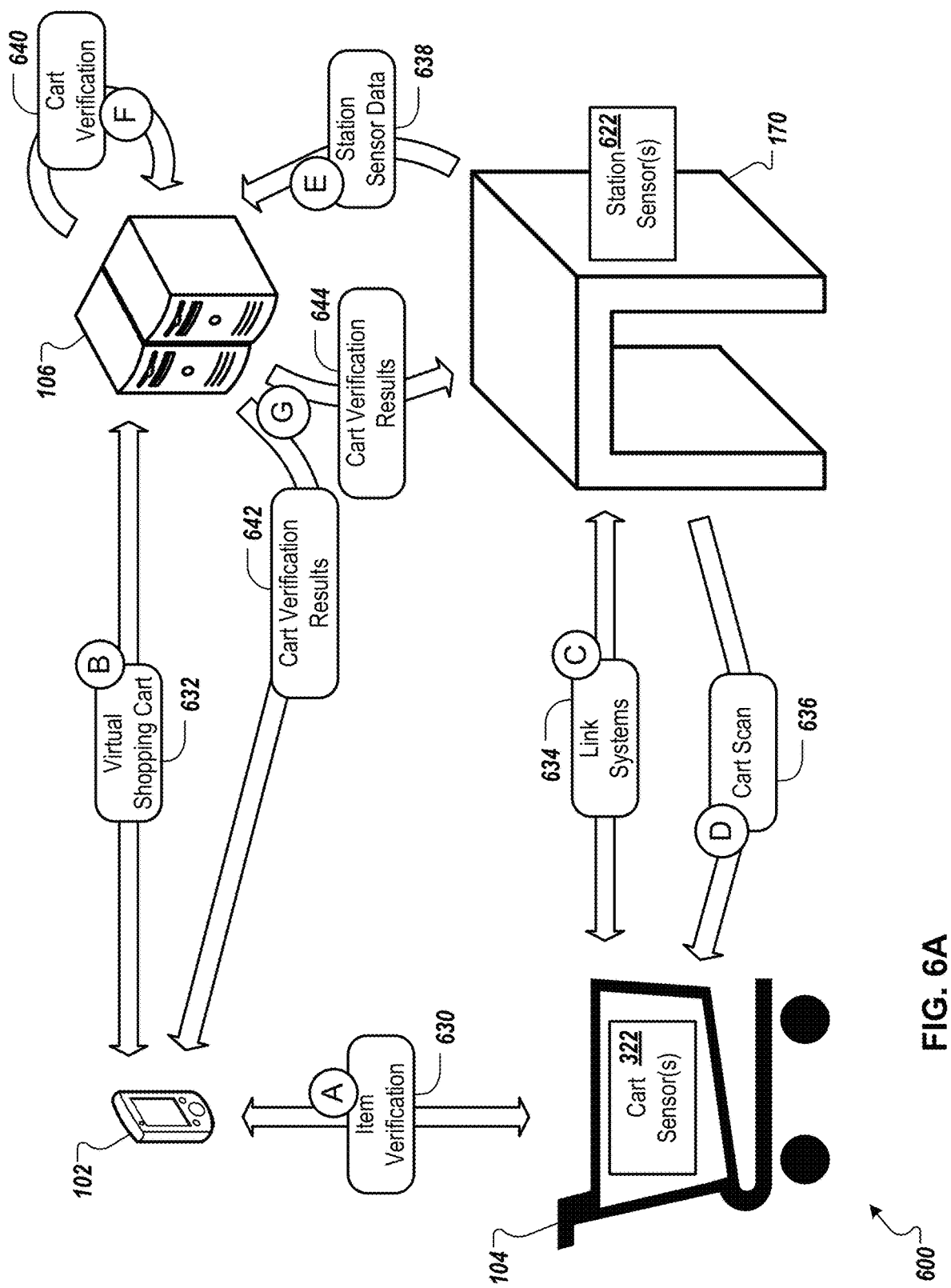
FIG. 6A depicts an example system for verifying items placed in physical shopping carts and for verifying the carts and their contents during an automated checkout process.
Figure 6B:
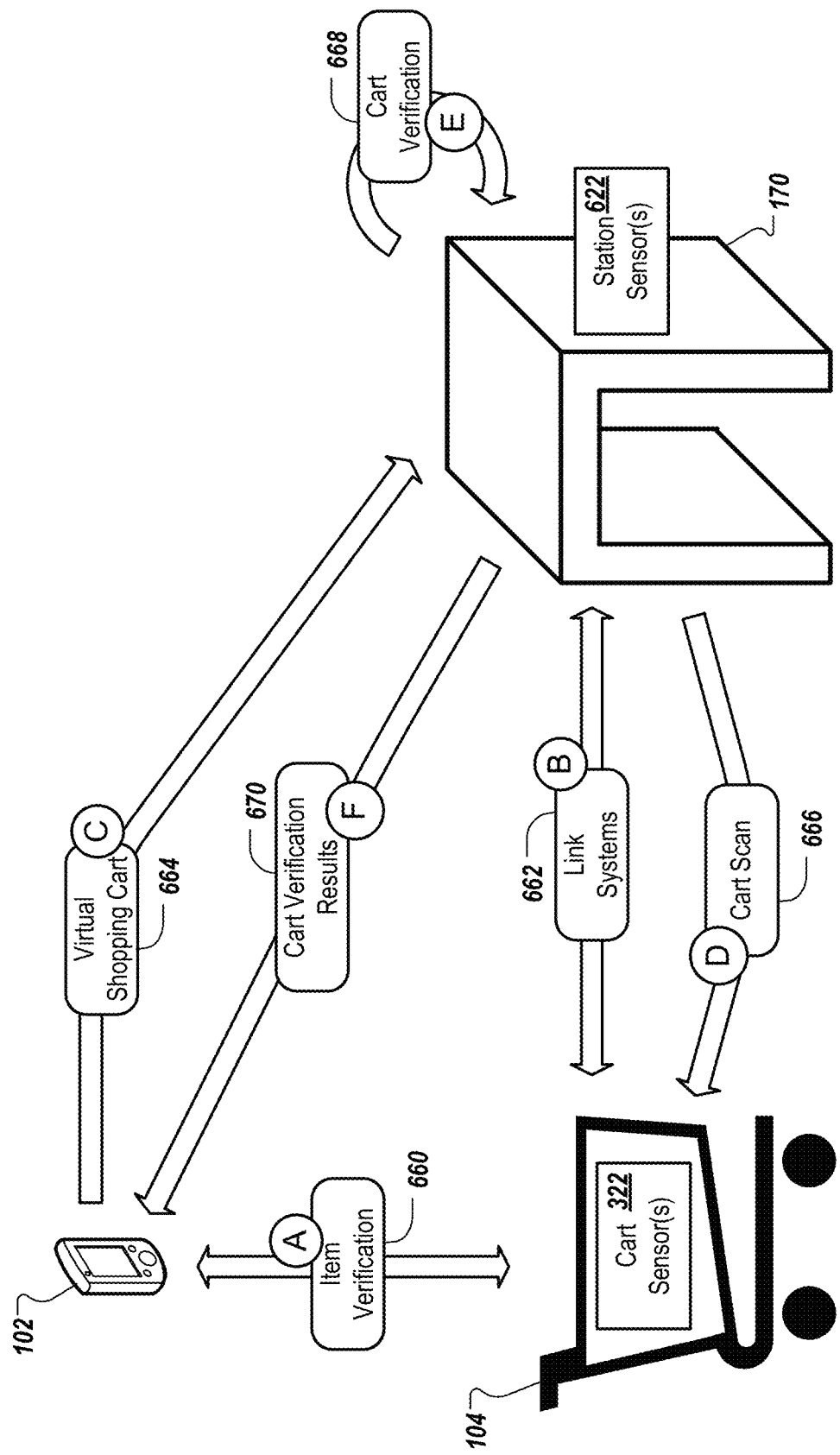
FIG. 6B depicts an example system for verifying items placed in physical shopping carts and for verifying the carts and their contents during an automated checkout process.

FIG. 5 depicts an example process flow 500 for verifying items by a shopping cart system and an automated checkout system. The shopping cart system, for example, can include a mobile device (e.g., mobile device 102, shown in FIGS. 1-4) and a shopping cart (e.g., shopping cart 104, shown in FIG. 1 and FIG. 2, and including cart computing system 210), and can optionally include a server system (e.g., server system 106, shown in FIGS. 1-3). The automated checkout system, for example, can include an automated checkout station (e.g., automated checkout station 170, shown in FIG. 1), and can also optionally include the server system (e.g., server system 106, shown in FIGS. 1-3). Example system configurations, and example communications between system components are described in further detail below with reference to FIGS. 6A and 6B. Referring to FIGS. 6A and 6B, for example, the automated checkout station 170 can include sensor(s) 622, including at least one sensor that is different from the sensor(s) 322 of the shopping cart. Further, similar to the mobile device 102 (as described with reference to FIG. 3), the automated checkout station 170 can include processor(s), memory, a power source, a communication interface, input device(s), and output device(s) (not shown).

In general, the process flow 500 includes operations for performing a primary verification of items by the shopping cart system as each item is added to a shopping cart during a shopping trip, and operations for performing a secondary verification of the cart and its contents by the automated checkout system at the completion of the shopping trip. By performing a multi-stage verification process, for example, a confidence in verification results can be increased. Further, with reference to FIGS. 6A-6B, since the shopping cart 104 can be equipped with a first set of sensors 322 (e.g., IR sensors, sound sensors, weight bump sensors, and/or other robust, relatively inexpensive sensors), and the automated checkout station 170 can be equipped with a second, different set of sensors 622 (e.g., RFID sensors, cameras, scales, and/or other relatively expensive sensors), the automated checkout station 170 can potentially verify items that are unverifiable by the shopping cart 104.

At 502, a verification of items can be performed for items that are verifiable by a shopping cart system. For example, the mobile device 102 and the cart computing system 210 of the shopping cart 104 (and optionally, the server system 106) can cooperatively verify item(s) (e.g., one or more items 150, shown in FIG. 1 and FIG. 2) as the item(s) are placed in the shopping cart 104, as described in detail with reference to FIGS. 4A-B. Items that are verifiable by the shopping cart system, for example, can include items that have physical properties that can be readily detected by the sensor(s) 322 (shown in FIG. 3) of the shopping cart 104. For example, various packaged items (e.g., cereal, milk, bread, ice cream, etc.) may have standard physical dimensions that can be consistently detected by IR sensors of the cart, may produce relatively consistent weight bumps that are detectable by weight sensors when the item is placed in the cart, and/or may produce relatively consistent sound signatures that are detectable by sound sensors when the item is placed in the cart. Items that are unverifiable by the shopping cart system, for example, can include items that have physical properties that cannot be readily detected by the sensor(s) 322 of the shopping cart 104. For example, various soft goods (e.g., clothing items) may not have standard physical dimensions that can be consistently detected by IR sensors of the cart (e.g., an item may assume different physical shapes as it enters the cart), may produce relatively inconsistent weight bumps (or undetectable weight bumps), and/or may produce relatively inconsistent sound signatures (or undetectable sound signatures). In some implementations, items may be associated with data that indicates whether the item is verifiable or unverifiable by a particular sensor and/or verification system. For example, the item data store 120 (shown in FIG. 1 and FIG. 3) can include, in association with an item identifier, item data that indicates whether an item is verifiable or unverifiable by a particular sensor type (e.g., a first flag that indicates whether the item is verifiable using IR sensors, a second flag that indicates whether the item is verifiable using weight sensors, a third flag that indicates whether the item is verifiable using sound sensors, a fourth flag that indicates whether the item is verifiable using RF sensors, a fifth flag that indicates whether the item is verifiable using cameras, and so forth).

At 504, a virtual shopping cart can be updated. For example, the mobile device 102 and/or the server system 106 can maintain a virtual shopping cart that includes data that applies to items that have been scanned (e.g., using the mobile device 102), placed in the shopping cart 104, and that have possibly been verified by the shopping cart system. For example, the mobile device 102 and/or the server system 106 can maintain a tally of items in the virtual shopping cart, a verification status of each item, and data that indicates whether the item is verifiable using the sensors 322 of the shopping cart 104, sensors 622 of the automated checkout station 170 (e.g., shown in FIGS. 6A-B), or both.

At 506, if a current shopping trip is incomplete, the process flow 500 can continue at 502 and 504, for example, as additional items are placed in the shopping cart 104, as the additional items are potentially verified by the shopping cart system, and as the virtual shopping cart is updated to reflect the additional items. If the current shopping trip is complete, at 508, for example, the shopping cart system can determine whether the items in the virtual shopping cart have been verified. For example, a virtual shopping cart may include items that are verifiable using sensors of the corresponding physical shopping cart and that have been verified (e.g., through successful verification), items that are verifiable using sensors of the corresponding physical shopping cart and that have not been verified (e.g., through unsuccessful verification), and items that are unverifiable using sensors of the corresponding physical shopping cart. In some implementations, determining whether the items in the virtual shopping cart have been verified can include determining whether the items in the virtual shopping cart that are verifiable using sensors of a corresponding physical shopping cart (or a threshold amount of such items) have actually been verified. For example, the mobile device 102 and/or the server system 106 can access a customer's virtual shopping cart, can determine whether a sufficient amount of verifiable items have been verified, and based on the determination, can present the customer with a notification of whether the customer is to proceed to manual checkout station 172 or automated checkout station 170 (shown in FIG. 1). The sufficient amount of verified and verifiable items, for example, can be based on a quantity-based threshold (e.g., a number of verified items relative to unverified items), a value-based threshold (e.g., a dollar value of verified items relative to unverified items), a confidence-value based threshold (e.g., a confidence value associated with verified items), or another suitable threshold.

At 510, if an insufficient amount of verifiable items have been verified, a user (e.g., the customer) can be provided with a notification to proceed to manual checkout station 172. Referring now to FIG. 7A, an example interface 700 is shown that can notify a user of items in a virtual shopping cart, and/or the notification to proceed to a manual checkout station. For example, the mobile device 102 can present the interface 700 through a mobile application, which can be executed by the device 102 and/or the server system 106 (e.g., as a cloud-based application). In the present example, the interface 700 includes a list of items 710 that have been scanned by the user (e.g., using the mobile device 102) and added to the user's virtual shopping cart, however not all of the items have been verified by the shopping cart system. Unverified items 712, 714, for example, can be marked with a visual indication (e.g., a graphical indicator, a note, a color, a font, etc.) that indicates that the items have not been verified. As another example, unverified item can be maintained in a separate list from verified items. As another example, information about whether an item has been verified or unverified can be maintained in the background and not presented to a user. In the present example, some of the unverified items are verifiable using sensors of a shopping cart (e.g., item 712, the ice cream container, may be potentially verifiable according to its item data, yet was not verified), whereas other unverified items are unverifiable using sensors of the shopping cart (e.g., item 714, the shirt, may be unverifiable by the shopping cart's sensors, according to its item data). In some implementations, unverified items that are potentially verifiable by the shopping cart system can be marked with a visual indication that is different from unverified items that are unverifiable by the shopping cart system. For example, item 712 (e.g., the potentially verifiable ice cream container) can be marked with a visual indication that is different from item 714 (e.g., the shirt that is unverifiable by the shopping cart's sensors). In the present example, the interface 700 can present a notification 718 (e.g., a message) that the user may proceed to a manual checkout station when finished with the shopping trip.

At 512, if a sufficient amount of verifiable items have been verified, the user (e.g., the customer) can be provided with a notification to proceed to automated checkout station 170. Referring now to FIG. 7B, an example interface 720 is shown that can notify a user of items in a virtual shopping cart, and the notification to proceed to an automated checkout station. For example, the mobile device 102 can present the interface 720 through a mobile application, which can be executed by the device 102 and/or the server system 106 (e.g., as a cloud-based application). In the present example, the interface 720 includes a list of items 730 that have been scanned by the user (e.g., using the mobile device 102), and added to the user's virtual shopping cart. In the present example, the items that are verifiable using sensors 322 of the shopping cart 104 have been verified by the shopping cart system, however item 734 (e.g., a shirt) is unverifiable using the sensors 322 of the shopping cart 104, according to its item data. The list of items 730 can include, for each item in the list, various sorts of data associated with the item, such as a description, price, image, quantity, weight, and/or other item data. In some implementations, some of the item data may be presented to the user (e.g., through the interface 720), whereas other item data (e.g., including verification statuses) may be maintained in the background. For example, the computing device 102 and/or the server system 106 can maintain an expected weight of each item in the list of items 730, for use in verifying the shopping cart 104 during an automated checkout process (e.g., weighing the cart 104 and its contents by the automated checkout station 170, and comparing an expected weight to an actual weight). In the present example, the interface 720 can present a total price of items in the virtual shopping cart, and can present a notification 738 (e.g., a message) to the user that the user may proceed to an automated checkout station when finished with the shopping trip.

At 514, an automated checkout system can be linked with a shopping cart system and a virtual shopping cart. For example, the automated checkout system that includes the automated checkout station 170 (and optionally, the server system 106) can be linked to the shopping cart system that includes the shopping cart 104, the mobile device 102 (and optionally, the server system 106), and the virtual shopping cart associated with the shopping cart system (e.g., the virtual shopping cart that corresponds to the physical shopping cart 104). In general, linking the systems and the virtual shopping cart can be performed through various wireless communication and/or identification scanning techniques. For example, when the shopping cart 104 arrives at the automated checkout station 170, the automated checkout station 170 can wirelessly detect the shopping cart 104 and/or the mobile device 102 (e.g., through near field communication (NFC) or another suitable wireless communication protocol). As another example, the automated checkout system 170 can include a scanner or another sort of image sensor that can identify an identification code (e.g., a barcode, a QR code, etc.) located on the shopping cart 104 or displayed by the mobile device 102. As another example, an identification code can be located on (or in proximity to) the automated checkout station 170, and the mobile device 102 can be used to scan the code. Once the shopping cart system and the automated checkout system are linked, for example, the automated checkout system can access the virtual shopping cart associated with the physical shopping cart 104. For example, the automated checkout station 170 can provide the identifier of the shopping cart 104 and/or the mobile device 102 to the server system 106 (e.g., along with its own identifier), and the server system 106 can access the virtual shopping cart. As another example, the mobile device 102 can provide the virtual shopping cart to the automated checkout station 170 and/or the server system 106.

At 516, an automated checkout system can perform a verification of items that are verifiable by the automated checkout system. For example, the automated checkout station 170 can include various sensors 622 (shown in FIGS. 6A-B) that may include sensors that are similar to or different from sensors 322 of the shopping cart 104. In the present example, the sensors 322 of the shopping cart 104 can include one or more IR sensors, sound sensors, and/or weight bump sensors, whereas the sensors 622 of the automated checkout station 170 can include one or more RFID sensors, cameras, and/or scales—although other examples may include different sensor configurations. The automated checkout station 170, for example, can use its sensors 622 to perform a secondary verification of the items in the shopping cart 104, including items that have been initially verified using the sensors 322 of the shopping cart 104, and items that were unverifiable by the shopping cart system. In general, the automated checkout station 170 can include at least one type of sensor that is a different type of sensor as compared to the types of sensors of the shopping cart 104, such that the automated checkout station 170 can verify at least some items that were unverifiable by the shopping cart system. For example, various soft goods (e.g., clothing items) may not be verifiable using the sensors 322 of the shopping cart 104, but may be verifiable using the sensors 622 of the automated checkout station 170 (e.g., a clothing item can include an RFID tag that is detectable using an RF sensor of the automated checkout system). As another example, some items may be verifiable by the shopping cart system and may be verifiable by the automated checkout system. For example, a high-value item may be packaged such that it is verifiable using the sensors 322 of the shopping cart 104, and also may be verifiable using the sensors 622 of the automated checkout station 170 (e.g., the packaging of the high-value item can include an RFID tag and can also be visually identifiable using one or more cameras). Thus, by performing a two-stage verification process in which items are first verified using the sensors 322 of the shopping cart system (e.g., as the items are placed in the shopping cart 104), and the items in the shopping cart 104 are later verified using the sensors 622 of the automated checkout system (e.g., when a shopping trip has been completed), each item will ideally be verified at least once, and some items may be verified multiple times.

Performing the verification of items can include positioning the shopping cart 104 relative to (e.g., in, on, through, etc.) the automated checkout station 170 such that the various sensors 622 of the automated checkout station 170 can perform various measurements and scans of the cart and items that have been placed in the cart. For example, RF sensors of the automated checkout station 170 can scan the shopping cart 104 for RFID tags affixed to items in the cart. As another example, cameras of the automated checkout station 170 can capture images of the shopping cart 104 and the items in the cart, and image processing techniques can be used to recognize identification codes, text, and other visible features of items in the cart. As another example, a scale of the automated checkout station 170 can weigh the cart and its contents. Measurements and/or scans performed by the automated checkout station 170 can be compared with a virtual shopping cart associated with the physical shopping cart 104 to verify the items referenced by the virtual shopping cart. For example, items detected by the RF sensors and/or cameras of the automated checkout station 170 can be reconciled with the virtual shopping cart to determine whether items that are expected to be in the physical shopping cart 104 are actually present, and/or to determine whether additional items that are not expected to be in the physical shopping cart 104 are found. If expected items are present and/or if additional, unexpected items are not found, for example, the shopping cart and its items can be verified, whereas if expected items are not present and/or if additional, unexpected items are found, the shopping cart and its items can be unverified. As another example, the physical shopping cart 104 can be weighed by the automated checkout station 170, and a total weight of the cart and the items in the cart can be compared with an expected total weight of the cart and the items in the cart (e.g., according to a tally of items in the virtual shopping cart, item data 122 indicating a weight of the items, and cart data 112 indicating a weight of the shopping cart 104). If the measured weight of the physical shopping cart 104 and the items in the cart substantially matches (e.g., within a threshold range) the expected total weight of the cart and its items, for example, the shopping cart and its items can be verified, whereas if the measured weight does not match the expected total weight, the shopping cart and its items can be unverified.

At 518, the automated checkout system can determine whether the shopping cart 104 and its items (and the corresponding virtual shopping cart) have been verified. At 510, if the shopping cart 104 and its items have not been verified, the user (e.g., the customer) can be provided with cart verification results, and a notification to proceed to the manual checkout station 172. Referring now to FIG. 7C, an example interface 740 is shown that can notify a user of items in a virtual shopping cart, and a notification to proceed to the manual checkout station. For example, the mobile device 102 can present the interface 740 through a mobile application, which can be executed by the device 102 and/or the server system 106 (e.g., as a cloud-based application). In the present example, the interface 740 includes a list of items 750 that have been scanned by the user (e.g., using the mobile device 102), and added to the user's virtual shopping cart, however not all of the items have been verified by the shopping cart system and the automated checkout system. For example, item 752 (e.g., a shirt) may be unverifiable by the shopping cart system, but potentially verifiable by the automated checkout system. However, in the present example, automated checkout system was unable to verify the item 752 (e.g., a detected RFID tag did not match an expected RFID tag for the item, or the expected RFID tag was not found). In the present example, the unverified item 752 can be marked with a visual indication (e.g., a graphical indicator, a note, a color, a font, etc.) that indicates that the item has not been verified. As another example, information about whether an item has been verified or unverified can be maintained in the background and not presented to a user. The interface 740, for example, can also present a notification 758 (e.g., a message) that the user is to proceed to a manual checkout station before leaving the store.

At 520, if the shopping cart 104 and its items have been verified, the user (e.g., the customer) can be provided with cart verification results, and a notification that the transaction has been finalized and that the user may leave the store. Referring now to FIG. 7D, an example interface 760 is shown that can notify a user of items in a virtual shopping cart, and a finalized transaction. For example, the mobile device 102 can present the interface 760 through a mobile application, which can be executed by the device 102 and/or the server system 106 (e.g., as a cloud-based application). In the present example, the interface 760 includes a list of items 770 that have been scanned by the user (e.g., using the mobile device 102), added to the user's virtual shopping cart, and verified by the shopping cart system, the automated checkout system, or both. After the items 770 have been verified, for example, the server system 106 can finalize the user's transaction, and the interface 760 can present a total price for the transaction, and can present a notification 778 (e.g., a message) to the user that the user's transaction is finalized and/or that the user may now leave the store.

Figure 8A:
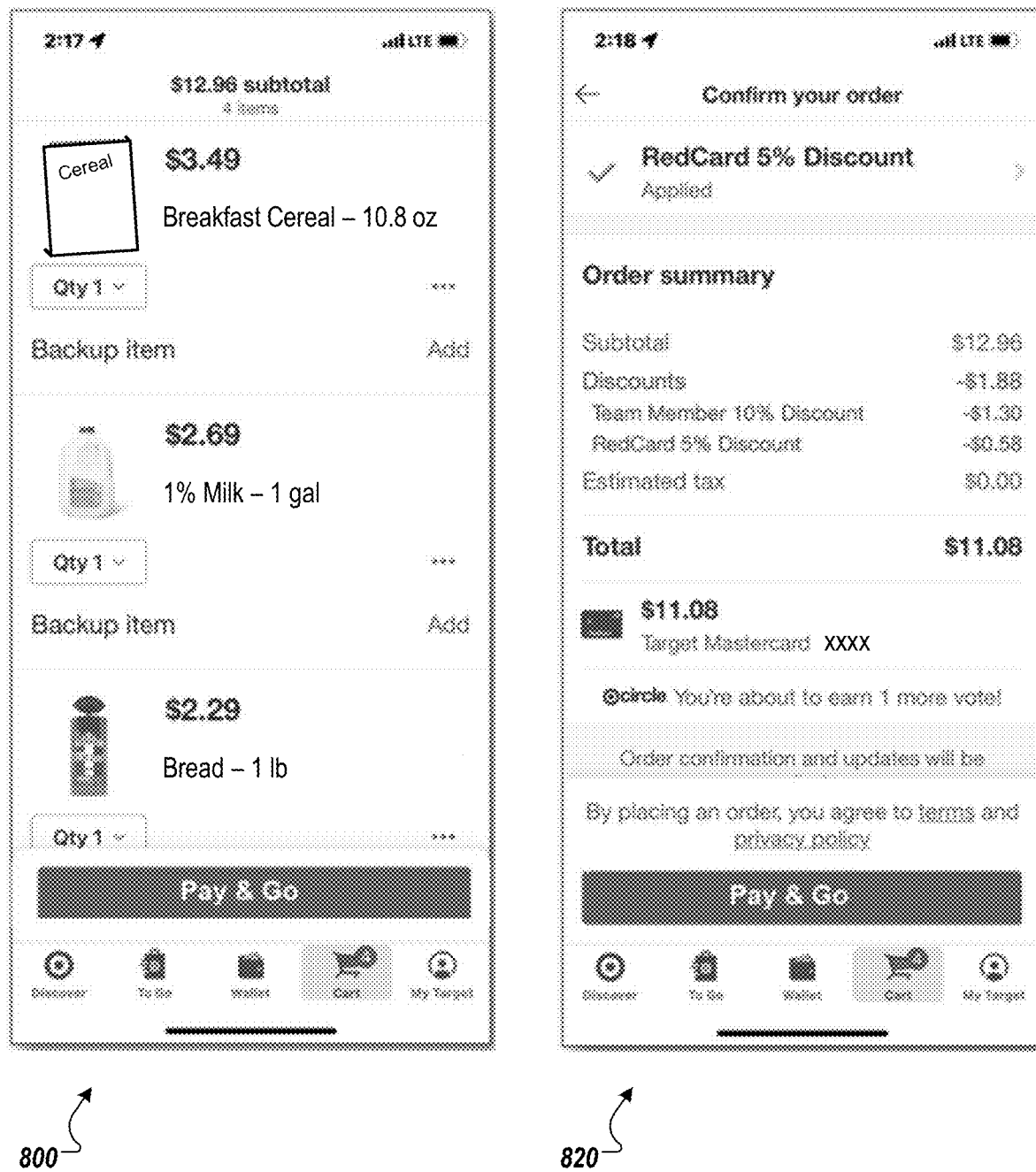
FIGS. 8A-B depict example interfaces for notifying users of items in a virtual shopping cart and available checkout options.
Figure 8B:
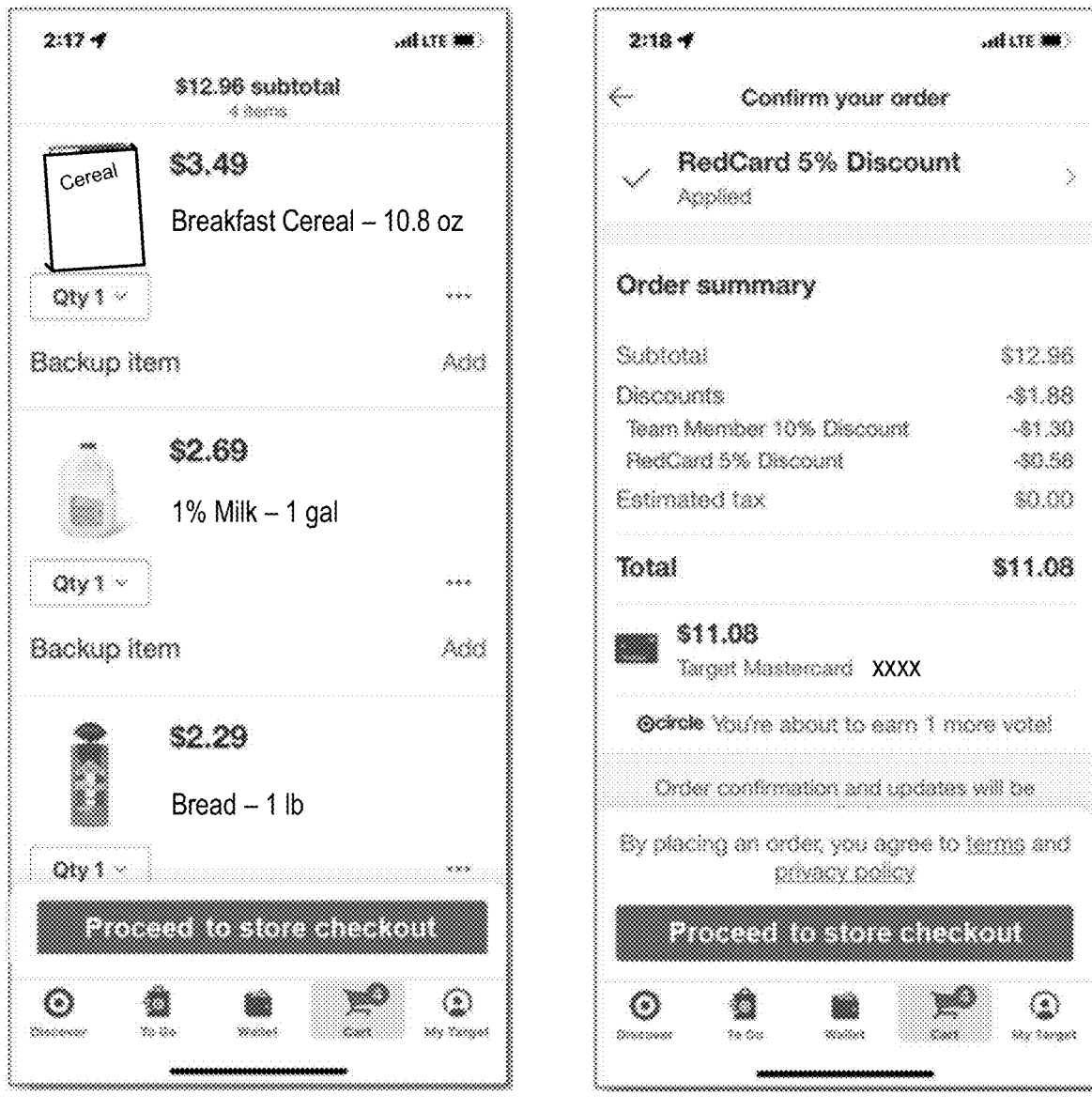

FIGS. 8A-B depict additional example interfaces 800, 820, 840, and 860 that can notify users of items in a virtual shopping cart and available checkout options. Referring to FIG. 8A, for example, the interfaces 800, 820 can be presented through a mobile application, which can be executed by the device 102 and/or the server system 106 (e.g., as a cloud-based application). In the present example, the interface 800 presents information (e.g., description, price, image, quantity, weight, etc.) associated with items that have been scanned by the user (e.g., using the mobile device 102), have been verified by the system 100 (e.g., with each item having been assigned a corresponding verification confidence score), and added to the user's virtual shopping cart. The interface 820, for example, facilitates completing a transaction for the user's shopping trip, including presenting an order summary that includes a subtotal, possible discounts, estimated tax, and a total charge for the shopping trip, along with information related to a selected payment method. Each of the interfaces 800, 820 in the present example can present a notification (e.g., a "Pay & Go" message) to inform the user that the current shopping trip qualifies for an automated checkout option.

Referring to FIG. 8B, for example, the interfaces 840, 860 can be presented through a mobile application, which can be executed by the device 102 and/or the server system 106 (e.g., as a cloud-based application). In the present example, the interface 840 presents information (e.g., description, price, image, quantity, weight, etc.) associated with items that have been scanned by the user (e.g., using the mobile device 102), that have been verified by the system 100 (e.g., with each item having been assigned a corresponding verification confidence score), and added to the user's virtual shopping cart. In the present example, verification confidence information for each item is not directly surfaced to the user, in that some items may have a relatively high verification confidence score, whereas other items may have a relatively low verification confidence score. An overall cart accuracy score (e.g., based on aggregating the individual item verification confidence scores, and optionally based on other factors, such as a user's purchase history, a user's reputation score, and other suitable factors) can be maintained in the background, for example, can be continually updated as the user adds and/or removes items from the physical shopping cart, and can be used to provide appropriate instructions to the user for finalizing a transaction for the current shopping trip. The interface 860, for example, facilitates completing a transaction for the user's shopping trip, including presenting an order summary total charge for the shopping trip, along with information related to a selected payment method. Each of the interfaces 840, 860 in the present example, can present a notification (e.g., a "Proceed to store checkout" message) to inform the user that the current shopping trip does not qualify for an automated checkout option, and that the user is to proceed to a manual checkout station instead.

FIG. 6A depicts an example system 600 for verifying items placed in physical shopping carts and for verifying the carts and their contents during an automated checkout process. The system 600, for example, can include a shopping cart system that includes mobile device 102 (also shown in FIGS. 1-4), shopping cart 104 (also shown in FIG. 1 and FIG. 2), and server system 106 (also shown in FIGS. 1-3), and can include an automated checkout system that includes automated checkout station 170 (also shown in FIG. 1) and server system 106 (also shown in FIGS. 1-3). The system 600, for example, can be used to perform operations of the example process flow 500 (shown in FIG. 5), in which a primary verification of items is performed by the shopping cart system (e.g., based on data from a set of sensor(s) 322 of the shopping cart 104) as each item is added to the shopping cart 104 during a shopping trip, and in which a secondary verification of items is performed by the automated checkout system (e.g., based on a different set of sensor(s) 622 of the automated checkout station 170) at the completion of the shopping trip. In general, the example system 600 depicts a server-based configuration in which various operations are performed by the server system 106. Operations of the automated checkout process are represented in example stages (A) to (G). Stages (A) to (G), for example, may occur in the illustrated sequence, a different sequence, and/or two or more stages (A) to (G) may be concurrent. In some examples, one or more stages (A) to (G) may be repeated multiple times during the automated checkout process.

In general, the primary verification of items can be performed by the shopping cart system during stages (A) and (B). During stage (A), for example, the shopping cart system (e.g., mobile device 102 and shopping cart 104) can perform a verification 630 of items that are placed in the shopping cart 104 and detected by the cart sensor(s) 322 during a shopping trip. Item verification 630, for example, is described in further detail with reference to operation 502 of the example process flow 500. During stage (B), for example, the virtual shopping cart 632 can be updated by the mobile device 102 and/or the server system 106. For example, after an item is verified (or not verified), a reference to the item can be added to the virtual shopping cart 632, along with the item's verification status. The virtual shopping cart 632, for example, can be maintained by the mobile device 102, the server system 106, or both. Updating the virtual shopping cart 634, for example, is described in further detail with reference to operation 504 of the process flow 500.

After primary verification of the items has been performed, and a sufficient amount of items have been verified, the shopping cart 104 can be directed to the automated checkout station 170, for example, and one or more operations can be performed (during stage (C)) to link 634 the shopping cart system with the automated checkout system. Linking the automated checkout system with the shopping cart system (and a virtual shopping cart associated with the shopping cart system), for example, is described in further detail with reference to operation 514 of the process flow 500.

In general, secondary verification of items can be performed by the automated checkout system during stages (D) to (F). During stage (D), for example, the automated checkout station 170 can use its sensors 622 perform a scan 636 of the shopping cart 104 and its items. During stage (E), for example, the automated checkout station 170 can provide sensor data 638 corresponding to the performed scan 636, to the server system 106. During stage (F), for example, the server system 106 can use the sensor data 638 received from the automated checkout station and a virtual shopping cart that corresponds to the physical shopping cart 104 to perform a verification 640 of the shopping cart 104 and its items. Performing the cart scan 636, obtaining sensor data 638, and performing the verification 640, for example, is described in further detail with reference to operation 516 of the process flow 500.

During stage (G), the server system 106 can provide cart verification results 642 to the mobile device 102, and/or can provide cart verification results 644 to the automated checkout station 170. The cart verification results 642, 644, for example, can include data for notifying the user of a successful verification (in which the cart and its contents have been verified by the automated checkout station 170), or an unsuccessful verification (in which the cart and its contents have not been verified by the automated checkout station 170). Notifying the user of an unsuccessful verification, for example, is described in further detail with reference to operation 510 of the process flow 500. Notifying the user of a successful verification and finalizing the user's transaction, for example, is described in further detail with reference to operation 520 of the process flow 500. Example interfaces 740 (shown in FIG. 7C) for notifying the user of an unsuccessful verification, and 760 (shown in FIG. 7D) for notifying the user of a successful verification are shown for possible presentation at the mobile device 102. However, similar interfaces may be presented at the automated checkout station 170 instead of, or in addition to presentation at the mobile device 102. As another example, the automated checkout station 170 can present a simplified interface (e.g., a green indicator light and a suitable corresponding graphic in response to a successful verification, or a red indicator light and suitable corresponding graphic in response to an unsuccessful verification, or another sort of simplified interface).

FIG. 6B depicts another example system 650 for verifying items placed in physical shopping carts and for verifying the carts and their contents during an automated checkout process. The system 650, for example, can include a shopping cart system that includes mobile device 102 (also shown in FIGS. 1-4) and shopping cart 104 (also shown in FIG. 1 and FIG. 2), and can include an automated checkout system that includes automated checkout station 170 (also shown in FIG. 1). The system 650, for example, can be used to perform operations of the example process flow 500 (shown in FIG. 5), in which a primary verification of items is performed by the shopping cart system (e.g., based on data from a set of sensor(s) 322 of the shopping cart 104) as each item is added to the shopping cart 104 during a shopping trip, and in which a secondary verification of items is performed by the automated checkout system (e.g., based on a different set of sensor(s) 622 of the automated checkout station 170) at the completion of the shopping trip. In general, the example system 600 depicts a localized configuration in which various operations are performed without the server system 106. Operations of the automated checkout process are represented in example stages (A) to (F). Stages (A) to (F), for example, may occur in the illustrated sequence, a different sequence, and/or two or more stages (A) to (F) may be concurrent. In some examples, one or more stages (A) to (F) may be repeated multiple times during the automated checkout process.

In general, the primary verification of items can be performed by the shopping cart system during stage (A). During stage (A), for example, the shopping cart system (e.g., mobile device 102 and shopping cart 104) can perform a verification 660 of items that are placed in the shopping cart 104 and detected by the cart sensor(s) 322 during a shopping trip. Item verification 660, for example, is described in further detail with reference to operation 502 of the example process flow 500. After verifying each item, for example, the mobile device 102 can update a local virtual shopping cart that corresponds to the physical shopping cart. For example, after an item is verified (or not verified), a reference to the item can be added to the virtual shopping cart, along with the item's verification status. Updating the virtual shopping cart, for example, is described in further detail with reference to operation 504 of the process flow 500.

After primary verification of the items has been performed, and a sufficient amount of items have been verified, the shopping cart 104 can be directed to the automated checkout station 170, for example, and one or more operations can be performed (during stage (B)) to link 662 the shopping cart system with the automated checkout system, and for the automated checkout system to receive virtual shopping cart 664 from the mobile device 102 (during stage (C)). Linking the automated checkout system with the shopping cart system (and the virtual shopping cart associated with the shopping cart system), for example, is described in further detail with reference to operation 514 of the process flow 500.

In general, secondary verification of items can be performed by the automated checkout system during stages (D) to (E). During stage (D), for example, the automated checkout station 170 can use its sensors 622 to perform a scan 666 of the shopping cart 104 and its items. During stage (E), for example, the automated checkout station 170 can perform a verification 668 of the shopping cart 104 and its items, based on sensor data resulting from the cart scan 666, and based on the virtual shopping cart 664 (corresponding to the physical shopping cart 104), that has been received from the mobile device 102. Performing the cart scan 666 to obtain the sensor data, and performing the verification 668, for example, is described in further detail with reference to operation 516 of the process flow 500.

During stage (F), the automated checkout system can provide cart verification results 670 to the mobile device 102. The cart verification results 670, for example, can include data for notifying the user of a successful verification (in which the cart and its contents have been verified by the automated checkout station 170), or an unsuccessful verification (in which the cart and its contents have not been verified by the automated checkout station 170). Notifying the user of an unsuccessful verification, for example, is described in further detail with reference to operation 510 of the process flow 500. Example interfaces 740 (shown in FIG. 7C) for notifying the user of an unsuccessful verification, and 760 (shown in FIG. 7D) for notifying the user of a successful verification are shown for possible presentation at the mobile device 102. However, similar interfaces may be presented at the automated checkout station 170 instead of, or in addition to presentation at the mobile device 102. As another example, the automated checkout station 170 can present a simplified interface (e.g., a green indicator light and a suitable corresponding graphic in response to a successful verification, or a red indicator light and suitable corresponding graphic in response to an unsuccessful verification, or another sort of simplified interface).

Figure 9A:
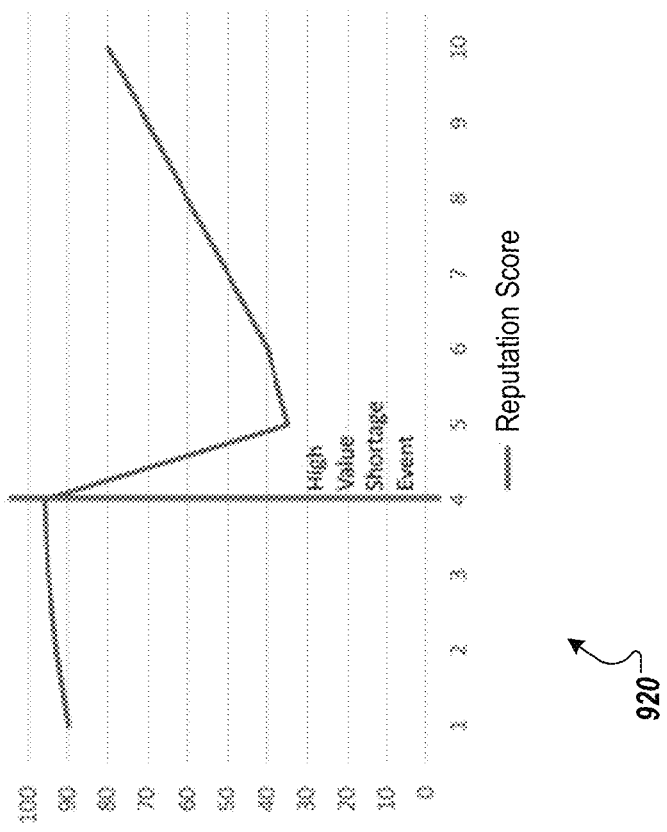
FIG. 9A depicts example trust growth curves for determining reputation scores for customers.
Figure 9A:
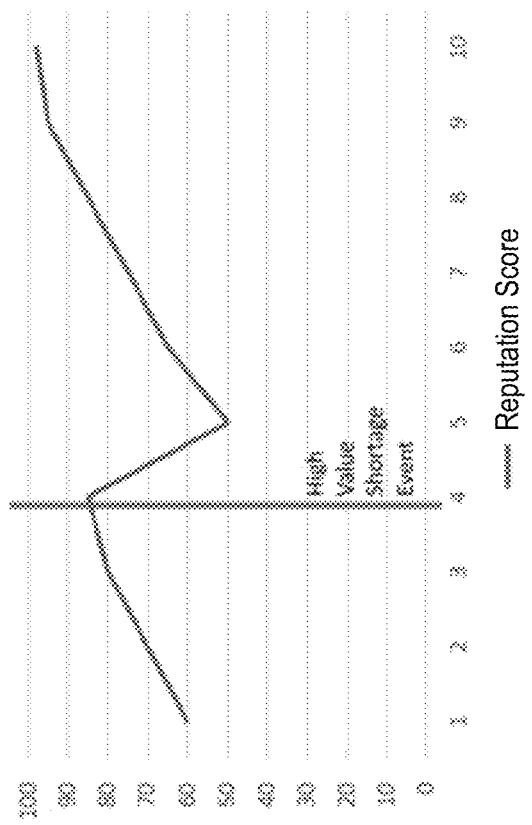

FIG. 9A depicts example trust growth curves 900, 920 for determining reputation scores for customers. In general, a reputation score can represent a degree of trust that a store has with respect to a particular customer, based on virtual cart accuracies during previous shopping trips (e.g., a virtual cart being shown to accurately represent a physical cart during checkout), previous shortage events (e.g., an incident of one or more items being found in a physical shopping cart that are not found in a corresponding virtual cart during checkout), a period of time during which the customer has frequented the store, and other suitable factors. Reputation scores, for example, can be maintained in the background for each customer (e.g., not being surfaced to the customer), and can change over time based on the customer's actions during shopping trips. A high reputation score, for example, can indicate that a customer's virtual cart has generally been determined as being accurate, shortage events have generally been infrequent and/or low-value, and/or the customer has frequented the store for a relatively long period of time (e.g., with many shopping trips having occurred over several months). A low reputation score, for example, can indicate that a customer's virtual cart has generally been determined as being inaccurate, shortage events have generally been frequent and/or high-value, and/or the customer has frequented the store for a relatively short period of time (e.g., with few shopping trips having previously occurred). The reputation scores maintained for each customer, for example, can be used as a factor in determining whether a customer is permitted to depart a store without first proceeding to an automated checkout station or a manual checkout station, whether the customer is to proceed to the automated checkout station, or whether the customer is to proceed to the manual checkout station, as part of a checkout process.

The trust growth curves 900, 920 shown in the present example represent different models for adjusting a customer's reputation score over time. Each trust growth curve 900, 920, for example, plots the customer's reputation score along a y-axis (e.g., shown here as a percentage value, however other scoring mechanisms may be used), as the reputation score changes over time (e.g., months, weeks, or other suitable units of time) represented along an x-axis, as impacted by potential shortage events. The trust growth curve 900, for example, is a moderate trust, low penalty trust growth curve, in which a customer's initial reputation score is moderate (e.g., 60%), and gradually increases over time to month four (e.g., when the score is 80%). In the present example, at month four, a high value shortage event occurs (e.g., a high value item is found in the customer's physical shopping cart that is not also in the corresponding virtual shopping cart, during an additional item verification performed during checkout). In response to the high value shortage event, for example, the customer's reputation score can be decreased by a relatively small amount (e.g., from 80% to 50%). The trust growth curve 920, for example, is a high trust, high penalty trust growth curve, in which a customer's initial reputation score is high (e.g., 90%), and gradually increases over time to month four (e.g., when the score is 95%). In the present example, at month four, a high value shortage even occurs, and in response to the high value shortage event, the customer's reputation score can be decreased by a relatively large amount (e.g., from 95% to 35%). According to each of the trust growth curves 900, 920, for example, if additional shortage events do not occur, the customer's reputation score can be gradually increased over time.

When a shortage event occurs, a customer can be directed to proceed to a manual checkout station, where the contents of the user's physical shopping cart are manually tallied. For example, in response to a shortage event that occurs during the automated checkout process 138 (shown in FIG. 1), the customer can be directed to the manual checkout station 172 (also shown in FIG. 1). In some implementations, when a shortage event occurs, a customer's reputation score can be immediately decreased. In some implementations, when a shortage event occurs, the customer can be given notice, the event can be stored for future reference, and the customer's reputation score can be decreased in response to a subsequent shortage event. In some implementations, a customer's reputation score can be adjusted according to a type of shortage event that has occurred. In general, a shortage event that is related to a low cost item, few items, and/or that may be unintentional can trigger a small decrease in a customer's reputation score, whereas a shortage event that is related to a high cost item, many items, and/or that is likely intentional can trigger a large decrease in the customer's reputation score. For example, if a customer had inadvertently added an extra of a low cost item, the customer's reputation score can remain unchanged. If the customer had added an extra of a low cost item on multiple different occasions, for example, the customer's reputation score can be adjusted by a small amount (e.g., a 5% decrease). If the customer had added multiple extras of a medium cost item, for example, the customer's reputation score can be adjusted by a moderate amount (e.g., a 20% decrease). If the customer had applied an incorrect barcode to an item, for example, the customer's reputation score can be adjusted by a large amount (e.g., a 40% decrease for a single item, or an 80% decrease for multiple items).

FIG. 9B depicts example trust tiers 940 of reputation scores, and corresponding example penalties and benefits for customers, based on the trust tiers. In general, relatively high trust tiers (e.g., including relatively high ranges of reputation scores) can be associated with increased benefits (and decreased penalties), whereas relatively low trust tiers (e.g., including relatively low ranges of reputation scores) can be associated with decreased benefits (and increased penalties) for a customer during an automated checkout process. For example, a customer having a reputation score in an upper trust tier can be allowed to depart a store during a checkout process with a low probability of an exit intervention (e.g., an automated and/or manual verification of one or more items in a physical shopping cart), a customer having a reputation score in a middle trust tier can have a moderate probability of an exit intervention, and a customer having a reputation score in a low trust tier can have a high probability of an exit intervention.

In the present example, the trust tiers 940 include four tiers (e.g., Full Trust, Building Trust, Lost Trust, and No Trust), however other examples may include fewer or additional tiers. The Full Trust tier (e.g., customers having a reputation score of 80-100%), for example, can generally include high-trust professional shoppers and customers. For such Full Trust customers, for example, a 1% random chance of an exit intervention can be applied to the customer, with a 99% chance that the customer will be permitted to walk out uninterrupted during a checkout process. The Building Trust tier (e.g., customers having a reputation score of 40-80%), for example, can generally include new shoppers with limited shopping history, or shoppers for whom a past shortage event occurred and who are now rebuilding a reputation score over time. For such Building Trust customers, for example, a 40% random chance of an exit intervention can be applied to the customer, with a 60% chance that the customer will be permitted to walk out uninterrupted during a checkout process. The Lost Trust tier (e.g., customers having a reputation score of 20-40%), for example, can generally include occasional offenders (e.g., customers for whom past shortage events have occasionally occurred). For such Lost Trust customers, for example, a 90% random change of an exit intervention can be applied to the customer, with a 10% chance that the customer will be permitted to walk out uninterrupted during a checkout process. The No Trust tier (e.g., customers having a reputation score of 0-20%), for example, can generally include consistent repeat offenders (e.g., customers for whom past shortage events have consistently occurred). For such No Trust customers, for example, an automated checkout option may not be offered until the customer's reputation score is built in other ways (e.g., through use of a customer loyalty program, purchases through other channels, etc.).

Figure 9C:
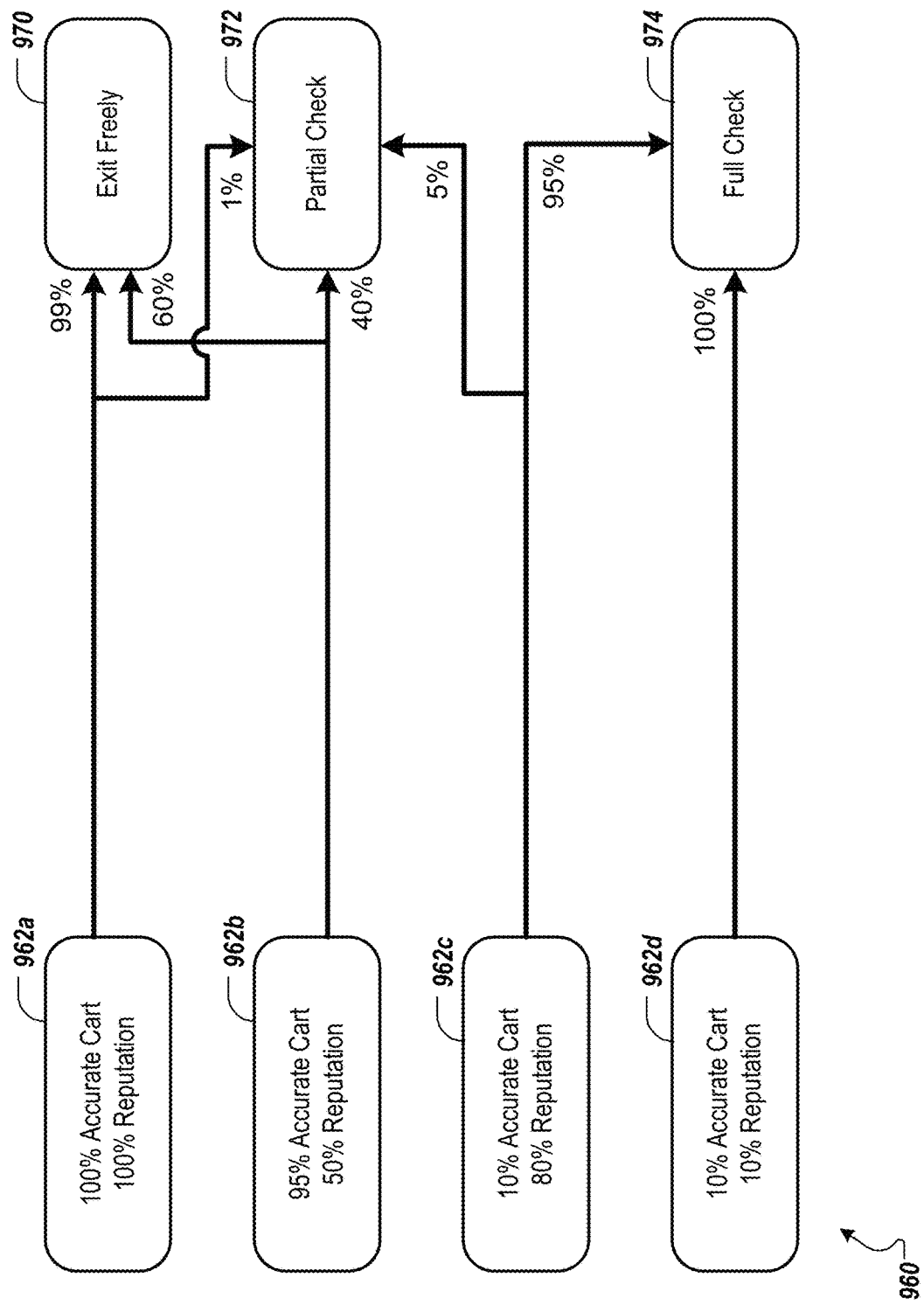
FIG. 9C depicts an example mapping for directing customers during an automated checkout process, based on a customer's reputation score and cart accuracy score.

In some implementations, reputation scores and cart accuracy scores can be used in combination when directing a customer during an automated checkout process. Referring now to FIG. 9C, an example mapping 960 is shown for providing directions to a customer during an automated checkout process, based on the customer's reputation score and cart accuracy score. In general, after passing through an automated checkout station, a customer's reputation score and cart accuracy score can be used as factors in determining whether minimal or no exit intervention is to be performed (e.g., when a reasonable confidence exists that the contents of the customer's physical shopping cart is represented by the virtual cart), whether moderate exit intervention is to be performed (e.g., when a reasonable confidence exists that some of the items in the customer's physical shopping cart are not represented by the virtual cart), or whether full exit intervention is to performed (e.g., when a reasonable confidence exists that many of the items in the customer's physical shopping cart are not represented by the virtual cart). For example, customers having relatively high reputation and cart accuracy scores can be directed to freely exit a store at 970, customers having moderate reputation and/or cart accuracy scores can be directed to have a partial check performed 972 (e.g., a manual check of 1-3 items in the customer's physical shopping cart having the lowest confidence score or highest value), and customers having low reputation and/or cart accuracy scores can be directed to have a full check performed 974 (e.g., a full check of a cart's contents at a manual checkout station).

Score combinations 962a-d are shown in the present example for purposes of illustration, however other combinations are possible. In general, an element of randomness is applied when determining directions to be provided to a customer after the customer passes through an automated checkout station, such that multiple different directions are possible, including a possibility of at least a partial check of items in the customer's physical shopping cart. For a customer having score combination 962a (e.g., a reputation score of 100% and a cart accuracy score of 100%), for example, the customer can be directed to exit freely (e.g., with a 99% probability), or to have a partial check performed (e.g., with a 1% probability). In some implementations, a cart accuracy score can be weighted more heavily than a reputation score, when determining a composite score for a customer. For a customer having score combination 962b (e.g., a reputation score of 50% and a cart accuracy score of 95%), for example, the customer can be directed to exit freely (e.g., with a 60% probability), or to have a partial check performed (e.g., with a 40% probability). As another example, for a customer having score combination 962c (e.g., a reputation score of 80% and a cart accuracy score of 10%), the customer can be directed to have a partial check performed (e.g., with a probability of 5%), or to have a full check performed (e.g., with a probability of 95%). In some implementations, when a customer's reputation score and/or cart accuracy score do not meet a threshold value, the customer can be directed to a manual checkout station, before or after passing through an automated checkout station. For a customer having score combination 962d (e.g., a reputation score of 10% and a cart accuracy score of 10%), for example, the customer can be directed to have a full check performed (with a probability of 100%).

Figure 10A:
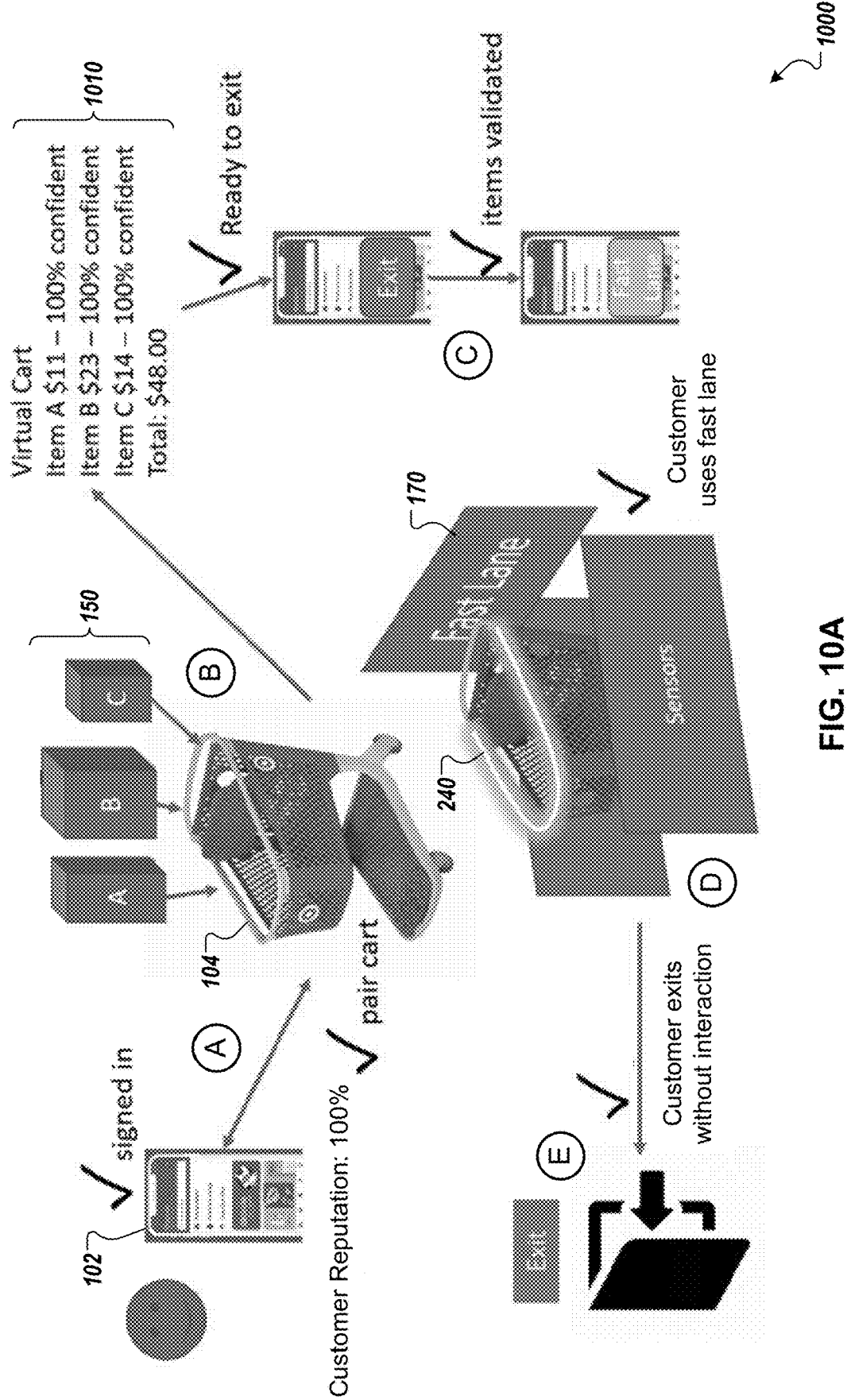
FIGS. 10A-B depict example process flows for directing customers during an automated checkout process.
Figure 10B:
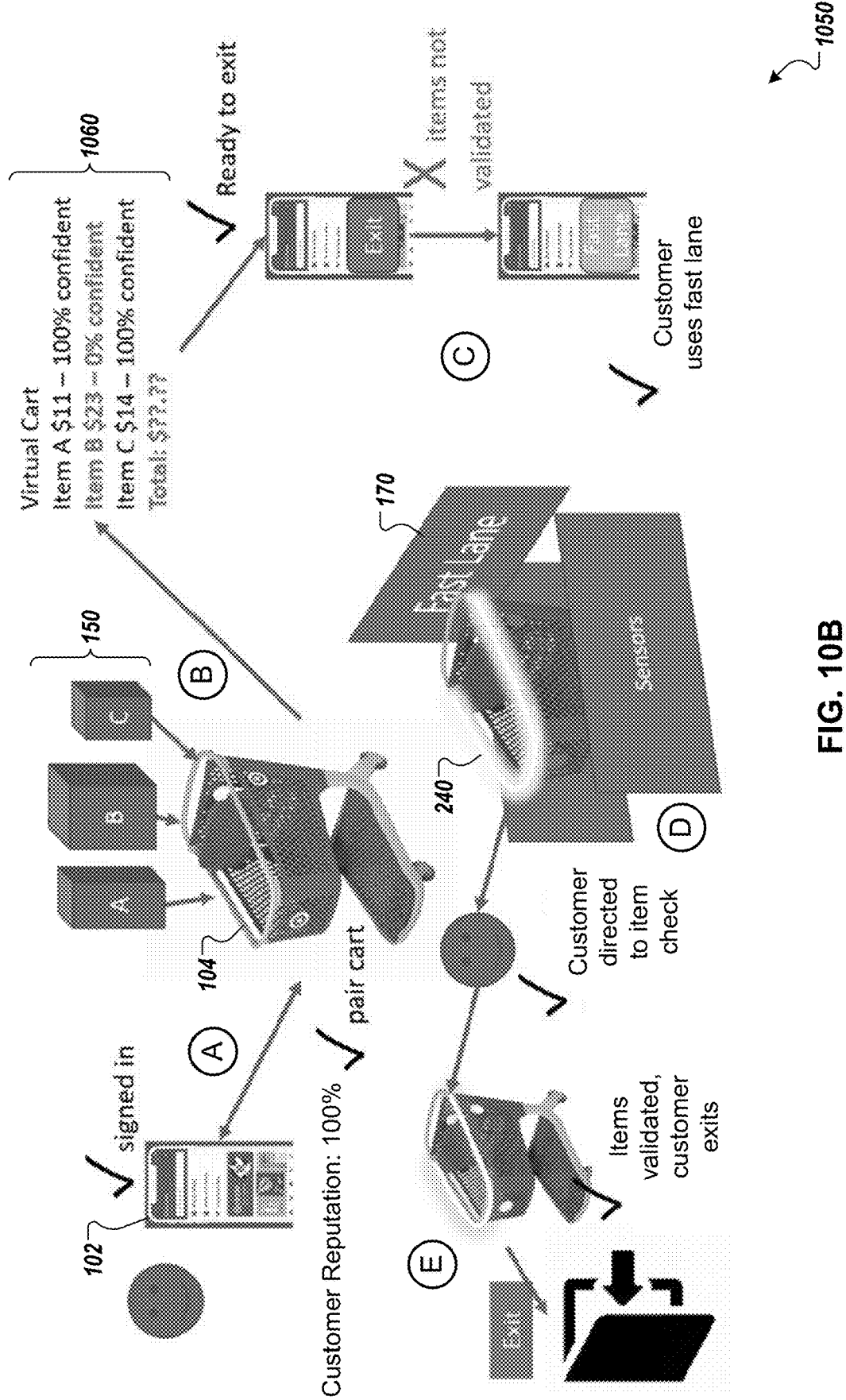

FIGS. 10A-B depict example process flows 1000, 1050, for directing customers during an automated checkout process. Process flows 1000, 1050, for example, each represent a different scenario in which a customer can shop in a store, using shopping cart 104 (e.g., a smart cart, also shown in FIGS. 1 and 2) and mobile device 102 (also shown in in FIGS. 1 and 2) running a shopping application. After completing a shopping trip, for example, the customer can direct the cart 104 to automated checkout station 170 (also shown in FIG. 1) where the customer's transaction can be finalized. In process flow 1000 (shown in FIG. 10A), for example, the customer's items are validated and the customer can exit the store without an intervention, however in process flow 1050 (shown in FIG. 10B), the customer's items are not validated and an additional item check performed for the customer.

Referring now to FIG. 10A, for example, process flow 1000 is shown, including stages (A) to (E). During stage (A), the customer signs in to the shopping application running on mobile device 102. In the present example, the customer has a high reputation score (e.g., 100%), due to the customer's virtual shopping cart having been accurate and shortage events generally not having occurred during previous shopping trips. The mobile device 102 can be paired with shopping cart 104 (e.g., as described above with respect to FIG. 1). In some implementations, multiple different shopping carts can be paired with a single mobile device. For example, during a shopping trip, a customer and a customer's partner can each operate a different physical shopping cart, and a different virtual cart can be maintained for each physical cart.

During stage (B), the customer can scan various items 150 (e.g., Item A, Item B, and Item C) using the mobile device 102, and can add the items to the shopping cart 104. The mobile device 102 (and/or the server system 106, shown in FIG. 1) can verify whether the scanned items match the items that are detected as entering the cart 104, according to item verification data for the scanned items, and sensor data from the cart's sensors. In the present example, Item A, Item B, and Item C are each verified, with a confidence value of 100%. Information associated with each of the items that have been scanned and added to the physical shopping cart 104 (e.g., including an item identifier, an item price, a verification status, and other relevant information) can be added to a virtual shopping cart 1010 that corresponds to the cart 104. In some implementations, portions of the virtual shopping cart may be surfaced to the customer (e.g., through the shopping application), whereas other portions may be maintained in the background. In the present example, item identifiers and prices can be presented to the customer, and item verification statuses can be hidden.

During stage (C), the customer can indicate through the shopping application running on the mobile device 104 that the shopping trip has been completed, and that the customer is ready to exit. In response to the indication, and based on the customer's reputation score and on an overall cart accuracy score (e.g., an aggregation of the individual item verification statuses), the shopping application can provide a user interface notification that instructs the customer to proceed to an appropriate station (e.g., an automated checkout station, a manual checkout station, a bagging station, etc.), or a notification that the customer is free to exit the store. In the present example, the customer is directed to use automated checkout station 170 (e.g., a fast lane).

During stage (D), in the present example, the customer can direct the shopping cart 104 to the automated checkout station 170. For example, the automated checkout station 170 can automatically receive a cart identifier of the shopping cart 104 as the cart enters the station, without an additional scan being performed by the customer (e.g., through a wireless data transfer, a light-based signal broadcast by indicators 240 (also shown in FIG. 2) of the cart 104 and detected by an image sensor of the station 170, or another suitable mechanism). When the physical shopping cart 104 has been identified at the automated checkout station 170, for example, the virtual shopping cart 1010 that corresponds to the cart 104 can be accessed by the station 170, and the station can perform a secondary verification of the items in the cart 104 (e.g., by using the station's sensors to verify the items, including items that were unverifiable by the cart itself). As another example, the automated checkout station 170 can attempt to identify the items in the physical shopping cart 104 without reference to a corresponding virtual cart, and can simply provide a list of identified items (e.g., with confidence values) to the mobile device 102 and/or the server system 106. If multiple carts are associated with a single transaction, for example, each of the multiple carts can be sequentially directed to the automated checkout station 170 for a secondary item verification in order to finalize a transaction.

During stage (E), in the present example, the customer's shopping cart 104 passes the secondary verification performed by the automated checkout station 170, the customer's transaction is finalized, and the customer is permitted to exit the store without a further interaction. For example, the automated checkout station 170 can include a display on which the total cost of the customer's transaction is presented, along with a notification that the transaction is finalized and that the customer may leave. The automated checkout station 170, for example, can print an itemized receipt for the customer. In some implementations, customer notifications can be presented by a mobile device and/or a physical shopping cart, instead of or in addition to notifications presented by an automated checkout station. For example, the shopping application running on the mobile device 102 can present such a customer notification. As another example, the shopping cart 104 can include an indicator 240 (e.g., an indicator light, also described with respect to FIG. 2) that notifies the customer that the transaction has been successfully finalized (e.g., by presenting a green light or another suitable color).

Referring now to FIG. 10B, for example, process flow 1050 is shown, including stages (A) to (E). Similar to process flow 1000 (shown in FIG. 10A), for example, during stage (A), the customer signs in to the shopping application running on mobile device 102, and the mobile device can be paired with shopping cart 104. Also similar to process flow 1000, for example, during stage (B), the customer can scan various items 150 (e.g., Item A, Item B, and Item C) using the mobile device 102, and can add the items to the shopping cart 104. The mobile device 102 (and/or the server system 106) can verify whether the scanned items match the items that are detected as entering the cart 104. In the present example, Item A and Item C are each verified, with a confidence value of 100%—however, Item B is unverified (e.g., with a confidence value of 0%). Information associated with each of the items that have been scanned and added to the physical shopping cart 104 can be added to a virtual shopping cart 1060 that corresponds to the cart 104.

During stage (C), the customer can indicate through the shopping application running on the mobile device 104 that the shopping trip has been completed, and that the customer is ready to exit. In response to the indication, and based on the customer's reputation score and on an overall cart accuracy score (e.g., an aggregation of the individual item verification statuses, including a status that indicates that Item B is unverified), for example, the shopping application can provide a user interface notification that instructs the customer to proceed to an appropriate checkout station. In the present example, the customer is directed to use automated checkout station 170 (e.g., the fast lane).

During stage (D), in the present example, the customer can direct the shopping cart 104 to the automated checkout station 170 (e.g., similar to stage (D) of process flow 1000). The automated checkout station 170, for example, can automatically receive a cart identifier of the shopping cart 104 as the cart enters the station, without an additional scan being performed by the customer. When the physical shopping cart 104 has been identified at the automated checkout station 170, for example, the virtual shopping cart 1060 that corresponds to the cart 104 can be accessed by the station 170, and the station can perform a secondary verification of the items in the cart 104.

During stage (E), in the present example, the customer's shopping cart 104 does not pass the secondary verification performed by the automated checkout station 170. For example, based on sensor data from sensors of the automated checkout station 170, Item B may remain unverified (e.g., a verification confidence value may remain 0% or another low value). As another example, the shopping cart 104 may be randomly selected for an exit intervention. In the present example, the customer can be directed to an employee of the store, or the employee can be directed to the automated checkout station 170, for a manual check of Item B and/or other items. For example, a display of the automated checkout station can present a notification for the customer and/or employee, and/or the shopping application running on the mobile device 102 can present the notification, and/or the notification can be presented through the indicator 240 (e.g., by presenting a yellow light or another suitable color). The store's employee can receive information related to the verification status of the physical shopping cart (e.g., a list of unverified items and/or instructions to perform a random item check on a mobile device operated by the employee), and the employee can perform the appropriate item check. In the present example, the customer's shopping cart 104 passes the item check, the customer's transaction is finalized (e.g., with a receipt), and the customer is permitted to exit the store.

Figure 11:
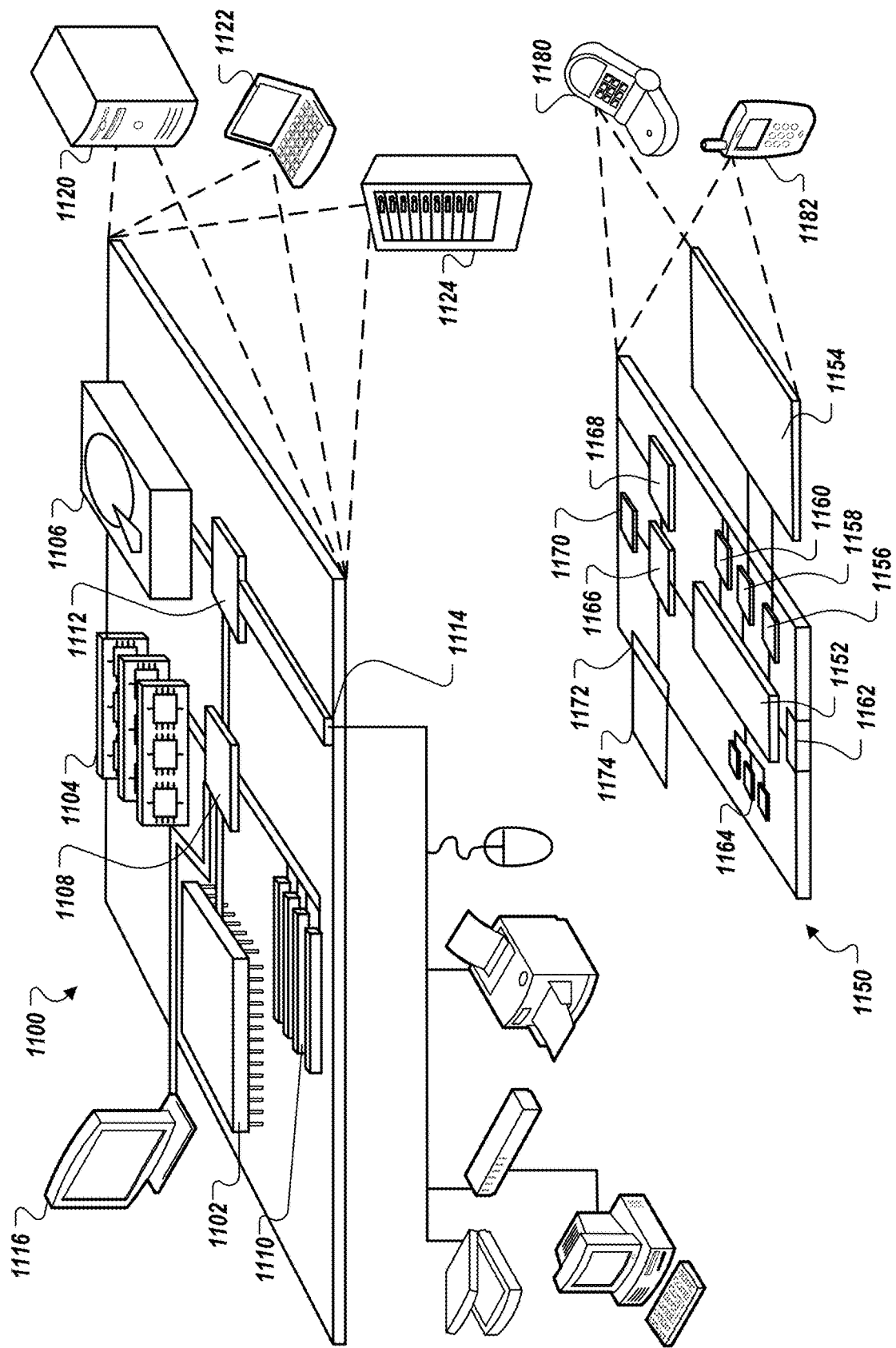
FIG. 11 is schematic diagram that shows an example of a computing device and a mobile computing device.

FIG. 11 shows an example of a computing device 100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. For example, the memory 1104 is a volatile memory unit or units. For example, the memory 1104 is a non-volatile memory unit or units. The memory 1104 can also be another form of computer-readable medium, such as a magnetic or optical disk.

The storage device 1106 is capable of providing mass storage for the computing device 1100. For example, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. For example, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device, such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication For example, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provide as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. For example, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. For example, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180. It can also be implemented as part of a smart-phone 1182, personal digital assistant, or other similar mobile device.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for verifying items added to a physical shopping cart in a retail environment, the method comprising:

generating, by an item verification engine, item verification results for each item when the item is scanned by a mobile computing device and added to the physical shopping cart during a shopping trip, based on (i) item verification data for the item that was scanned, and (ii) cart sensor data that was generated by one or more cart sensors of the physical shopping cart when the item was added to the physical shopping cart, wherein the item verification results indicate whether the item that was added to the physical shopping cart is determined as being the same as the item that was scanned;

after generating the item verification results for the item, updating a virtual shopping cart that maintains a list of items that have been scanned by the mobile computing device, to include a representation of the item along with the item verification results for the item;

determining, by a server system of the retail environment, an overall item verification status for the physical shopping cart, based at least in part on an aggregation of the item verification results for the items in the list of items maintained by the virtual shopping cart;

in response to the overall item verification status indicating that the list of items maintained by the virtual shopping cart accurately represents the items that have been added to the physical shopping cart, generating message data for presentation at the mobile device that indicates that a cart verification of the physical shopping cart and its items is to be performed at an automated checkout station; and generating cart verification results for the physical shopping cart and its items at the automated checkout station, based at least in part on (i) the list of items maintained by the virtual shopping cart, and (ii) station sensor data that has been generated by station sensors of the automated checkout station and that are distinct from the cart sensors of the physical shopping cart, wherein the station sensor data represents an assessment of the physical shopping cart and at least one of the items that have been placed in the physical shopping cart.

2. The method of claim 1, wherein the item verification engine is executed by the server system of the retail environment, with the mobile computing device running an application that is configured to (i) receive the cart sensor data from the physical shopping cart, (ii) forward the cart sensor data to the server system, and (iii) transmit an identifier of the item that was scanned to the server system, and with the server system retrieving the item verification data for the item that was scanned based on the identifier of the item.

3. The method of claim 1, wherein the item verification engine is executed by the mobile computing device, with the physical shopping cart transmitting the cart sensor data to the mobile computing device, and with the mobile computing device (i) transmitting an identifier of the item that was scanned to the server system, and (ii) receiving, from the server system, the item verification data for the item that was scanned based on the identifier of the item.

4. The method of claim 1, wherein the item verification engine is executed by a cart computing system of the physical shopping cart, with the physical shopping cart receiving, from the mobile computing device, the item verification data for the item that was scanned by the mobile computing device.

5. The method of claim 1, wherein the one or more cart sensors comprise at least one of an infrared sensor, a sound sensor, or a weight bump sensor.

6. The method of claim 1, wherein the item verification results for the item are presented at the mobile computing device.

7. The method of claim 1, wherein the item verification results for the item are presented through a visual, sonic, and/or tactile indication generated by the physical shopping cart.

8. The method of claim 1, wherein the item verification results for the item are not presented at the mobile computing device nor the physical shopping cart.

9. The method of claim 1, wherein generating the cart verification results for the physical shopping cart and its items comprises:
automatically performing an identification of the physical shopping cart in response to the physical shopping cart entering the automated checkout station;
accessing the virtual shopping cart that is associated with the physical shopping cart, based on the performed identification of the physical shopping cart;
while the items remain in the physical shopping cart, performing an assessment of the physical shopping cart and the items that have been added to the physical shopping cart, using the station sensors of the automated checkout station; and
generating the cart verification results based on the assessment of the physical shopping cart and the items that have been added to the physical shopping cart.

10. The method of claim 9,
wherein the station sensors of the automated checkout station comprise one or more radio frequency identification sensors,
wherein performing the assessment of the physical shopping cart and the items that have been added to the physical shopping cart comprises (i) using the one or more radio frequency identification sensors to detect radio frequency tags on items in the physical shopping cart, and (ii) determining a set of expected radio frequency tags, based on the virtual shopping cart, and
wherein the cart verification results indicate a successful verification of the physical shopping cart and its items when each of the detected radio frequency tags matches a corresponding radio frequency tag in the set of expected radio frequency tags.

11. The method of claim 9,
wherein the station sensors of the automated checkout station comprise a camera,
wherein performing the assessment of the physical shopping cart and the items that have been added to the physical shopping cart comprises (i) using the camera to identify items in the physical shopping cart, and (ii) determining a set of expected items, based on the virtual shopping cart, and
wherein the cart verification results indicate a successful verification of the physical shopping cart and its items when each of the identified items matches a corresponding item in the set of expected items.

12. The method of claim 9,
wherein the station sensors of the automated checkout station comprise a scale,
wherein performing the assessment of the physical shopping cart and the items that have been added to the physical shopping cart comprises (i) receiving a sensed weight of the physical shopping cart and the items in the physical shopping cart, and (ii) determining an expected weight of the physical shopping cart and the items in the physical shopping cart, based on a tally of items associated with the virtual shopping cart, and
wherein the cart verification results indicate a successful verification of the physical shopping cart and its items when the sensed weight matches the expected weight.

13. The method of claim 1, further comprising:
based on the cart verification results, (i) adjusting a reputation score of an operator of the physical shopping cart and the mobile computing device, (ii) storing the adjusted reputation score by the server system of the retail environment, and (iii) using the adjusted reputation score as a factor when determining a subsequent overall item verification status of the physical shopping cart during a subsequent shopping trip.

14. The method of claim 13, wherein the reputation score of the operator is adjusted to be a higher score when the cart verification results generated for the physical shopping cart and its items at the automated checkout station indicate a successful verification of the physical shopping cart and its items.

15. The method of claim 13, wherein the reputation score of the operator is adjusted to be a lower score when the cart verification results generated for the physical shopping cart and its items at the automated checkout station indicate an unsuccessful verification of the physical shopping cart and its items.

16. The method of claim 15, further comprising:
determining a value of a set of items that are identified by the station sensors of the automated checkout station and that are missing from the virtual shopping cart, wherein an amount which the reputation score for the operator is adjusted lower is proportional to the value of the determined set of items.

17. The method of claim 13, further comprising:
during the subsequent shopping trip, (i) determining that the overall item verification status for the physical shopping cart, combined with the adjusted reputation score, does not meet a threshold criteria for proceeding to the automated checkout station, and (ii) in response to the determining, generating message data for presentation at the mobile device that indicates that a verification of the physical shopping cart and its items is to be performed at a manual checkout station.

18. The method of claim 13, further comprising:
during the subsequent shopping trip, (i) determining that the overall item verification status for the physical shopping cart, combined with the adjusted reputation score, meets a threshold criteria for exiting the retail environment without first proceeding to the automated checkout station or a manual checkout station, (ii) in response to the determining, generating message data for presentation at the mobile device that the operator of the physical shopping cart is permitted to exit the retail environment after finalizing a transaction for the items in the virtual shopping cart.

19. The method of claim 1, further comprising:
in response to the cart verification results indicating an unsuccessful verification of the physical shopping cart and its items, generating message data for presentation at the mobile device or the automated checkout station that indicates that a verification of the physical shopping cart and its items is to be performed at a manual checkout station.

20. The method of claim 1, further comprising:
in response to the cart verification results indicating a successful verification of the physical shopping cart and its items, (i) finalizing a transaction for the items in the virtual shopping cart, and (ii) generating message data for presentation at the mobile device or the automated checkout station that the operator of the physical shopping cart is permitted to exit the retail environment.

* * * * *